United States Patent
Rotter et al.

(10) Patent No.: US 9,663,247 B2
(45) Date of Patent: May 30, 2017

(54) SYSTEMS, METHODS, AND VACUUM CHUCKS FOR TRANSFERRING FLEXIBLE ELONGATE BODIES

(71) Applicant: The Boeing Company, Huntington Beach, CA (US)

(72) Inventors: Daniel M. Rotter, Lake Forest Park, WA (US); Kieran Patrick Davis, Seattle, WA (US); Stephen Lee Metschan, Black Diamond, WA (US); Richard V. Phillips, Enumclaw, WA (US); Joseph J. Pruss, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/633,979

(22) Filed: Feb. 27, 2015

(65) Prior Publication Data

US 2016/0251091 A1    Sep. 1, 2016

(51) Int. Cl.
*B64F 5/00* (2006.01)
*B25B 11/00* (2006.01)
(Continued)

(52) U.S. Cl.
CPC ............ *B64F 5/0036* (2013.01); *B23Q 3/088* (2013.01); *B25B 11/005* (2013.01); *B64F 5/50* (2017.01);
(Continued)

(58) Field of Classification Search
CPC ....... B66C 1/02; B66C 1/0281; B66C 1/0237; B23Q 3/088; B64F 5/0036; B64G 47/91; B64G 47/918; B65H 3/0883
(Continued)

(56) References Cited

U.S. PATENT DOCUMENTS 2,893,581 A * 7/1959 Cushman ................ B66F 9/181
                                                           294/189
2,942,745 A * 6/1960 Horton .................... B66F 9/181
                                                           294/186
(Continued)

FOREIGN PATENT DOCUMENTS

CN     104016218 A      9/2014
DE     11019029         10/2002
(Continued)

OTHER PUBLICATIONS

U.S. Appl. No. 13/732,961, filed Jan. 2, 2013, Rotter et al.
(Continued)

*Primary Examiner* — Kaitlin Joerger
(74) *Attorney, Agent, or Firm* — D'Ascenzo Intellectual Property Law, P.C.

(57) ABSTRACT

Systems, methods, and vacuum chucks for transferring flexible elongate bodies are disclosed herein. The vacuum chucks include an elongate rigid support, a vertically oriented vacuum surface, a vacuum manifold, and a skirt seal. The systems include an elongate horizontal support structure, a transfer structure, a plurality of vertical linkages, which are operatively attached to the elongate horizontal support structure, and a plurality of vacuum chucks. Each of the plurality of vacuum chucks is operatively attached to a respective one of the plurality of vertical linkages. The methods include suspending an elongate horizontal support structure with a transfer structure, aligning each of a plurality of vacuum chucks with a respective portion of a vertical surface of a flexible elongate body, selectively actuating each of the plurality of vacuum chucks to retain the respective portion of the vertical surface of the flexible elongate body, and lifting the flexible elongate body.

23 Claims, 10 Drawing Sheets

(51) Int. Cl.
*B23Q 3/08* (2006.01)
*B66C 1/02* (2006.01)
*B64F 5/50* (2017.01)

(52) U.S. Cl.
CPC .......... *B66C 1/0243* (2013.01); *B66C 1/0256* (2013.01); *B66C 1/0281* (2013.01)

(58) Field of Classification Search
USPC ........................................................ 414/627
See application file for complete search history.

(56) References Cited

U.S. PATENT DOCUMENTS

| | | | |
|---|---|---|---|
| 3,054,521 A * | 9/1962 | Harris | B66F 9/181 414/619 |
| 3,118,554 A * | 1/1964 | Brainard | B66F 9/181 294/65 |
| 3,187,989 A * | 6/1965 | Barto | B66F 9/181 294/186 |
| 4,066,249 A | 1/1978 | Huber et al. | |
| 4,129,328 A * | 12/1978 | Littell | B65G 47/918 294/65 |
| 5,088,878 A * | 2/1992 | Focke | B65G 47/91 294/188 |
| 5,348,602 A | 9/1994 | Makarenko et al. | |
| 6,245,275 B1 | 6/2001 | Holsinger | |
| 6,367,855 B1 * | 4/2002 | Schmalz | B25J 15/0616 294/186 |
| 6,431,623 B1 * | 8/2002 | Roeters | B65G 47/91 271/90 |
| 6,641,131 B2 * | 11/2003 | Stohr | B65H 3/0883 271/107 |
| 7,938,466 B2 * | 5/2011 | Joguet | B25J 15/0616 294/189 |
| 8,473,094 B2 * | 6/2013 | Becker | B65G 47/914 294/65 |
| 8,534,730 B2 * | 9/2013 | Strohmayr | B66C 1/0218 294/185 |
| 8,556,617 B2 * | 10/2013 | Reinhold | B25J 15/0052 156/232 |
| 8,857,877 B2 * | 10/2014 | Lin | B25J 15/0061 269/71 |
| 8,944,481 B2 * | 2/2015 | Collado Jimenez | B25J 15/0061 294/185 |
| 8,974,618 B1 | 3/2015 | Rotter et al. | |
| 9,273,800 B2 * | 3/2016 | Angst | F16K 51/02 |
| 9,375,908 B2 * | 6/2016 | Metschan | B32B 38/1858 |
| 2003/0143062 A1 * | 7/2003 | Bennison | B66C 1/0256 414/627 |
| 2008/0080962 A1 * | 4/2008 | Holtmeier | B25J 15/0052 414/627 |
| 2011/0139577 A1 | 6/2011 | Panides et al. | |
| 2014/0060732 A1 | 3/2014 | Shair et al. | |
| 2014/0072775 A1 | 3/2014 | De Mattia | |
| 2014/0199153 A1 * | 7/2014 | Reinhold | B65H 3/0816 414/800 |
| 2014/0367037 A1 | 12/2014 | Metschan et al. | |
| 2014/0367039 A1 | 12/2014 | Robins et al. | |
| 2015/0165699 A1 | 6/2015 | Carretti et al. | |
| 2015/0259159 A1 * | 9/2015 | Herfert | B65G 49/067 414/798.5 |

FOREIGN PATENT DOCUMENTS

| | | | |
|---|---|---|---|
| DE | 102010034720 A1 * | 2/2012 | ......... B25J 15/0616 |
| DE | 202011100042 U1 | 6/2012 | |
| EP | 0163201 | 12/1985 | |
| EP | 1905709 A2 | 4/2008 | |
| EP | 2412658 A1 | 2/2012 | |
| FR | 895153 | 1/1945 | |
| FR | 2928855 | 9/2009 | |
| WO | WO 2006/043983 | 4/2006 | |

OTHER PUBLICATIONS

U.S. Appl. No. 13/886,976, filed May 3, 2013, Metschan et al.
U.S. Appl. No. 14/621,843, filed Feb. 13, 2015, Davis et al.
European Patent Office, Partial European Search Report for related European Patent Application No. 16155112, dated Jul. 20, 2016.
Machine generated English translation of the abstract of FR 2928855, downloaded from Espacenet.com on Jul. 20, 2016.
Machine generated English translation of the abstract of DE 10119029, downloaded from Espacenet.com on Jul. 20, 2016.
European Patent Office, Extended European Search Report for related European Patent Application No. 16155112.2, dated Oct. 31, 2016.
Machine generated English translation of the abstract of CN 104016218 A, downloaded from Espacenet.com on Oct. 28, 2016.
Machine generated English translation of the abstract of DE 202011100042 U1, downloaded from Espacenet.com on Oct. 28, 2016.

* cited by examiner

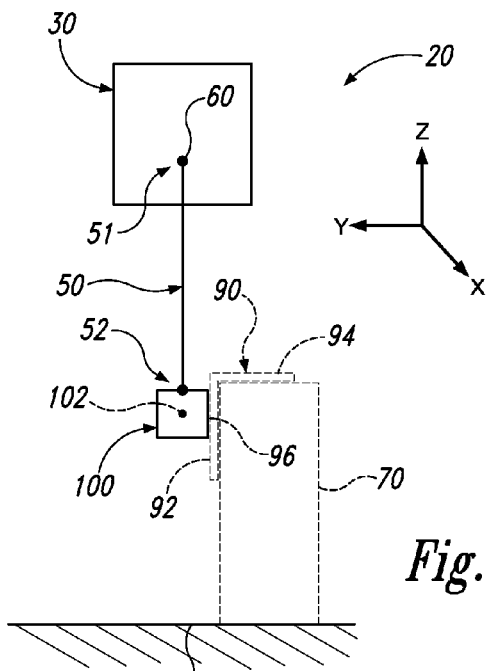
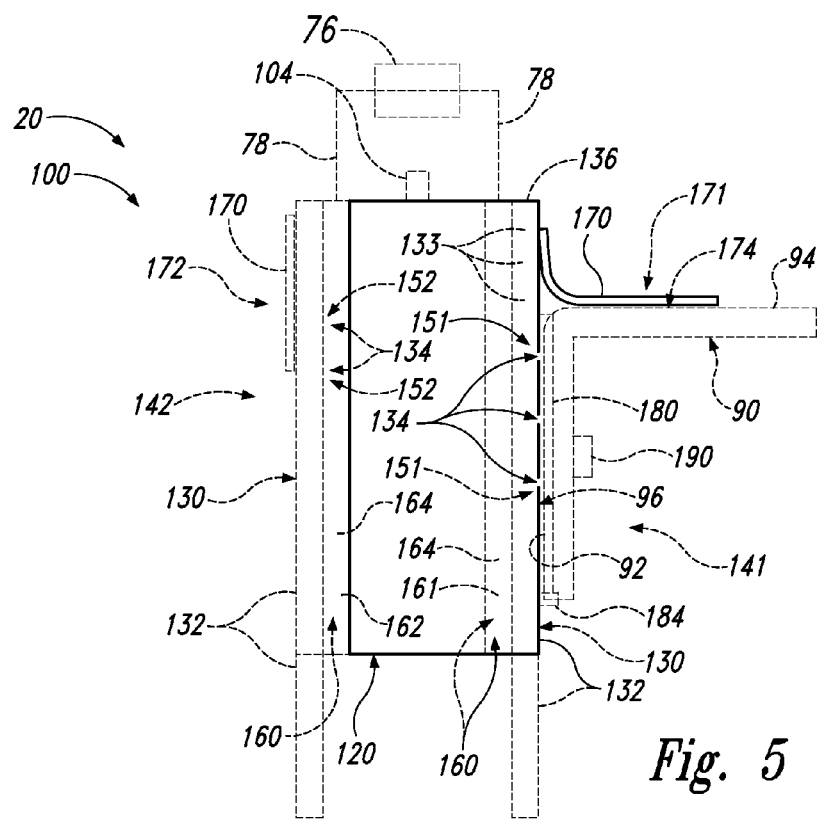

SYSTEMS, METHODS, AND VACUUM CHUCKS FOR TRANSFERRING FLEXIBLE ELONGATE BODIES

FIELD

The present disclosure relates to systems, methods, and vacuum chucks for transferring flexible elongate bodies.

BACKGROUND

During the fabrication of large composite structures, such as aircraft, it may be desirable to convey, transfer, and/or otherwise move flexible elongate bodies. Under certain conditions, it may be important to perform the transfer process without significant deformation of the flexible elongate bodies, as deformation may damage the flexible elongate bodies. As an example, uncured composite layups may be transferred from a layup tool to a cure mandrel, and deformation of the uncured composite layups during transfer may cause buckling and/or wrinkling of the uncured composite layup. Such bucking and/or wrinkling may be undesirable and/or may require that the uncured composite layup be reworked and/or scrapped.

In addition to their flexible nature, the flexible elongate bodies may have various conformations, and it may be desirable to transfer a plurality of different flexible elongate bodies, with differing conformations, utilizing a single, or the same, systems, methods, and/or vacuum chucks. As an example, stringers for the wings of composite aircraft may vary in shape with a location of a given stringer within the wing of the composite aircraft. Under these conditions, it may be cost-prohibitive to utilize a separate and/or different transfer system to transfer each of the different stringers.

Historically, transfer of flexible elongate bodies often has been a labor-intensive, manual process in which a large number of people are utilized to lift and transfer the flexible elongate bodies. However, such a process often produces deformation of and/or damage to the flexible elongate bodies. Thus, there exists a need for improved systems, methods, and/or vacuum chucks for transferring flexible elongate bodies.

SUMMARY

Systems, methods, and vacuum chucks for transferring flexible elongate bodies are disclosed herein. The vacuum chucks include an elongate rigid support, a vertically oriented vacuum surface, a vacuum manifold, and a skirt seal. The vertically oriented vacuum surface includes a plurality of vacuum holes and extends along a length of the elongate rigid support. The vertically oriented vacuum surface is supported by the elongate rigid support and is configured to contact a vertical surface of the flexible elongate body during transfer of the flexible elongate body by the vacuum chuck.

The vacuum manifold is in fluid communication with the plurality of vacuum holes and is configured to apply a retention vacuum to the plurality of vacuum holes to retain the flexible elongate body on the vertically oriented vacuum surface. The skirt seal extends along a length of the vertically oriented vacuum surface. The skirt seal may be sized and located to form a fluid seal with the flexible elongate body and/or to resist peeling of the flexible elongate body from the vertically oriented vacuum surface when the flexible elongate body is in contact with the vertically oriented vacuum surface and the retention vacuum is applied to the plurality of vacuum holes.

The systems include an elongate horizontal support structure and a transfer structure that is configured to support the elongate horizontal support structure. The systems further include a plurality of vertical linkages. Each of the plurality of vertical linkages extends between an upper end and a lower end, and the upper end is operatively attached to the elongate horizontal support structure such that the plurality of vertical linkages extends from the elongate horizontal support structure. The systems also include a plurality of vacuum chucks. Each of the plurality of vacuum chucks includes a respective lift support that is operatively attached to the lower end of a respective one of the plurality of vertical linkages. Each of the plurality of vacuum chucks is configured to selectively retain a respective portion of the vertical surface of the flexible elongate body.

The methods include suspending an elongate horizontal support structure with a transfer structure. An upper end of each of a plurality of vertical linkages is operatively attached to the elongate horizontal support structure and each of the plurality of vertical linkages extends vertically from the elongate horizontal support structure. A respective vacuum chuck of a plurality of vacuum chucks is operatively attached to a lower end of each of the plurality of vertical linkages, and the suspending the elongate horizontal support structure includes suspending the plurality of vacuum chucks. The methods further include aligning each of the plurality of vacuum chucks with a respective portion of the vertical surface of the flexible elongate body and selectively actuating each of the plurality of vacuum chucks to retain the respective portion of the vertical surface of the flexible elongate body. The methods also include lifting the flexible elongate body via translation of the elongate horizontal support structure such that the flexible elongate body is suspended from the plurality of vacuum chucks.

BRIEF DESCRIPTION OF THE DRAWINGS

FIG. 4 is a schematic cross-sectional view of the system of FIG. 3 taken along line 4-4 of FIG. 3.

FIG. 5 is a schematic representation of examples of a vacuum chuck according to the present disclosure.

DESCRIPTION

Figure 1:
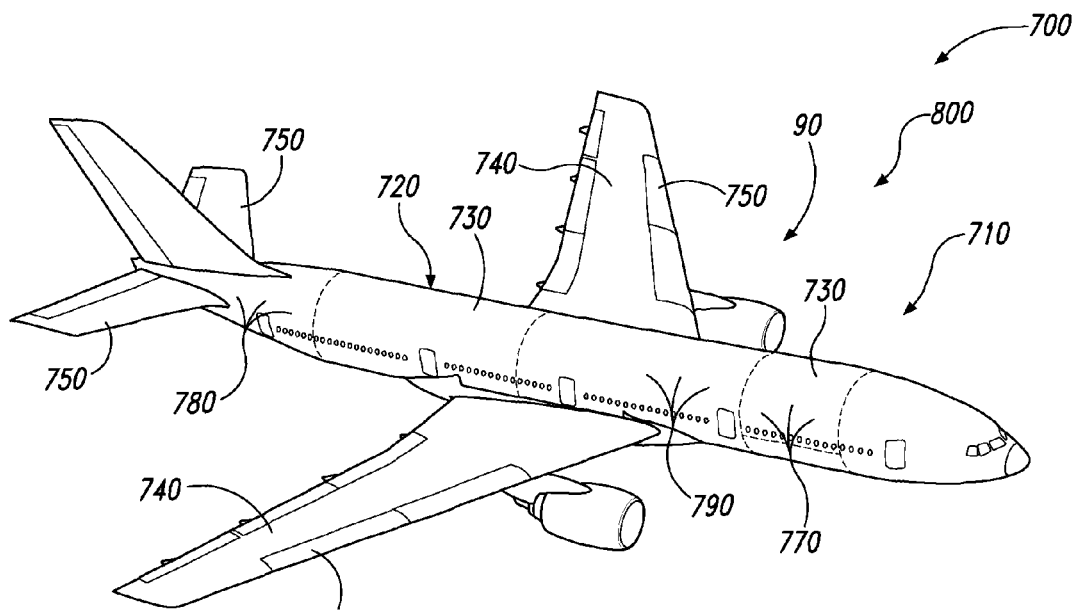
FIG. 1 is an example of an aircraft that includes a flexible elongate body that may be transferred using the systems, vacuum chucks, and methods according to the present disclosure.

FIGS. 1-18 provide examples of systems 20, vacuum chucks 100, and/or methods 300, according to the present disclosure, for transferring a flexible elongate body. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
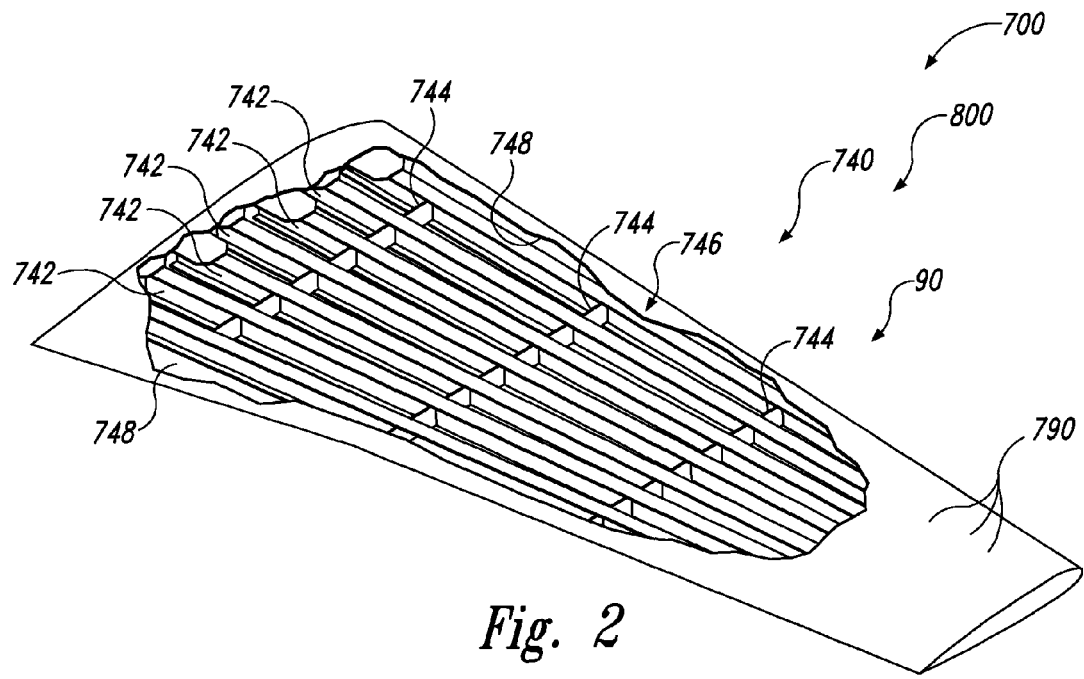
FIG. 2 is an example of a wing that may form a portion of the aircraft of FIG. 1.

FIG. 1 is an example of an aircraft 700 that includes a composite structure 800 that may be constructed utilizing systems 20, vacuum chuck 100, and/or methods 300, according to the present disclosure. FIG. 2 is an example of a wing 740 that may form a portion of aircraft 700 and includes composite structure 800. Aircraft 700 and/or composite structure 800 thereof may include a plurality of flexible elongate bodies 90. As an example, aircraft 700 may include skin segments 790 that may form, cover, and/or be an outer surface of any suitable portion of aircraft 700 and/or a plurality of stringers 770 that, together with a plurality of frames 780, may support an inner surface of skin segments 790.

As illustrated in FIG. 2, wing 740 may include a plurality of wing stringers 742, which may extend along a length of the wing. Wing 740 also may include a plurality of ribs 744. Wing stringers 742 and ribs 744 together may form and/or define at least a portion of an inner support structure 746 for wing 700, which may support an inner surface 748 of skin segments 790 that cover wing 740. Skin segments 790, stringers 770, frames 780, wing stringers 742, and/or ribs 744 may, at least temporarily and/or during construction thereof, be flexible elongate bodies 90 that may be constructed utilizing systems 20, vacuum chucks 100, and/or methods 300, according to the present disclosure.

It is within the scope of the present disclosure that any suitable portion of aircraft 700 may be formed from and/or may be composite structure 800. As examples, composite structure 800 may form, or form a portion of, an airframe 710, a fuselage 720, a fuselage barrel 730, a wing 740, and/or a stabilizer 750 of aircraft 700.

Figure 3:
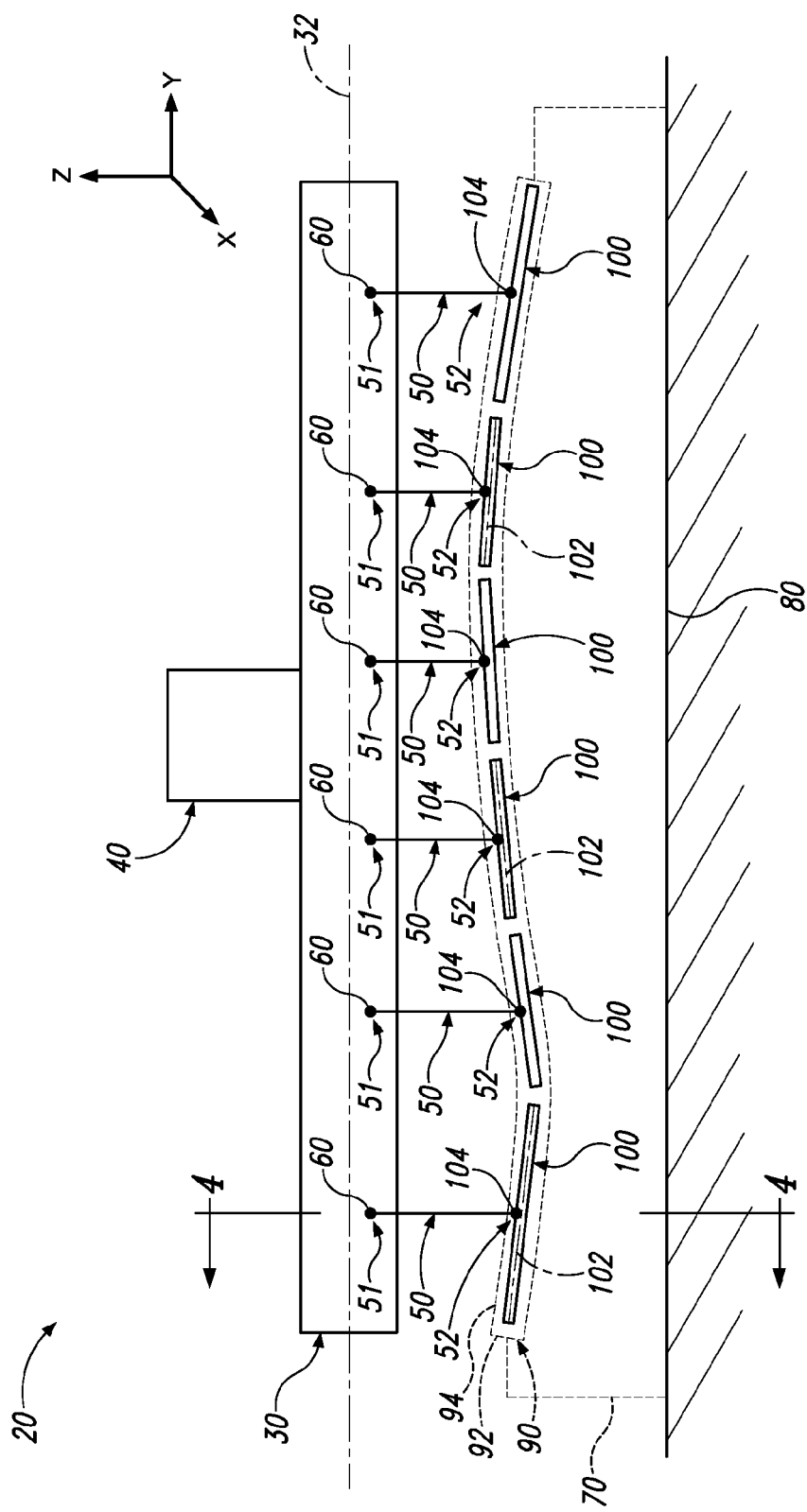
FIG. 3 is a schematic side view of a system, according to the present disclosure, for transferring a flexible elongate body.

FIG. 3 is a schematic side view of a system 20, according to the present disclosure, for transferring a flexible elongate body 90. FIG. 4 is a schematic cross-sectional view of the system of FIG. 3 taken along line 4-4 of FIG. 3. System 20 includes an elongate horizontal support structure 30 and a transfer structure 40 that is configured to support elongate horizontal support structure 30. As illustrated in FIG. 3, elongate horizontal support structure 30 may define a longitudinal axis 32 that may extend in a horizontal, or at least substantially horizontal, direction (such as the Y-direction of FIG. 3) and/or that may extend parallel to, or at least substantially parallel to, a ground surface 80; however, this specific orientation is not required.

System 20 further includes a plurality of vertical linkages 50. Each vertical linkage 50 has, or extends between, an upper, or first, end 51 and a lower, or second, end 52. Upper end 51 is operatively attached to elongate horizontal support structure 30 such that each vertical linkage 50 extends from elongate horizontal support structure 30. As illustrated in FIGS. 3-4, vertical linkages 50 may extend from elongate horizontal support structure 30 in a vertical, or at least substantially vertical, direction (such as the Z-direction of FIGS. 3-4) and/or may extend below elongate horizontal support structure 30; however, this specific orientation is not required.

System 30 also includes a plurality of vacuum chucks 100. Each vacuum chuck 100 includes a lift support 104 and is operatively attached to lower end 52 of a respective vertical linkage 50 via lift support 104. In addition, each vacuum chuck 100 is configured to selectively retain a respective portion of a vertical surface 92 of flexible elongate body 90, as discussed in more detail herein.

As discussed, system 20 may be configured to transfer flexible elongate body 90. Flexible elongate body 90 may be formed on and/or supported by a support surface 70, and system 20 may be utilized to separate flexible elongate body 90 from support surface 70 and/or to convey flexible elongate body 90 in any suitable direction subsequent to separation from support surface 70. Examples of support surface 70 include any suitable table, bench, fixture, horizontal support surface, vertical support surface, mandrel, layup mandrel, and/or composite charge layup mandrel.

During operation of system 20, elongate horizontal support structure 30 may be aligned with flexible elongate body 90 such that each vacuum chuck 100 is proximal to a respective portion of vertical surface 92. Subsequently, each vacuum chuck 100 may be aligned with and brought into contact with the respective portion of vertical surface 92. Then, a retention vacuum may be applied to each vacuum chuck 100, thereby retaining the respective portion of vertical surface 92 on each vacuum chuck 100. As illustrated in FIG. 3 and discussed in more detail herein, alignment of vacuum chucks 100 with flexible elongate body 90 may include aligning one or more vacuum chucks 100 such that a longitudinal axis 102 thereof is not parallel to, or aligned with, a longitudinal axis 102 of one or more other vacuum chucks 100. Stated another way, longitudinal axis 102 of each vacuum chuck 100 may be aligned with a trajectory of the respective portion of vertical surface 92. This difference in the direction of respective longitudinal axes 102 may be due to the nonlinear and/or arcuate nature of flexible elongate body 90, which is discussed in more detail herein.

Subsequently, elongate horizontal support structure 30 and/or support surface 70 may be translated to separate flexible elongate body 90 from support surface 70 and/or to suspend flexible elongate body 90 with, or via, vacuum chucks 100. System 20 may be configured such that vertical surface 92 of flexible elongate body 90 is in a planar, or at least substantially planar, conformation prior to being retained by vacuum chucks 100, subsequent to being retained by vacuum chucks 100, and/or subsequent to being suspended with vacuum chucks 100. Such a configuration may permit transfer of flexible elongate body 90 without deformation, or at least significant deformation, thereof.

Elongate horizontal support structure 30 may include any suitable structure that may support vertical linkages 50 and/or from which vacuum chucks 100 may be suspended via vertical linkages 50. As examples, elongate horizontal support structure 30 may include and/or be a truss and/or a gantry.

Elongate horizontal support structure 30 may be a rigid, or at least substantially rigid, elongate horizontal support structure. Additionally or alternatively, elongate horizontal support structure 30 may be configured to be suspended from transfer structure 40 prior to flexible elongate body 90 being retained with vacuum chucks 100. Under these conditions, elongate horizontal support structure 30 may be pre-deflected to a pre-loaded conformation prior to selective retention of flexible elongate body 90 by vacuum chucks 100, thereby decreasing a potential for deformation of flexible elongate body 90 due to deflection of elongate horizontal support structure 30 during transfer of flexible elongate body 90 by system 20.

As discussed in more detail herein, system 20 may be configured to transfer large and/or long flexible elongate bodies. As such, elongate horizontal support structure 30 may have, or define, a length of at least 10 meters, at least 15 meters, at least 20 meters, at least 25 meters, at least 30 meters, at least 40 meters, or at least 50 meters. Additionally or alternatively, the length of elongate horizontal support structure 30 also may be less than 100 meters, less than 90 meters, less than 80 meters, less than 70 meters, less than 60 meters, less than 50 meters, less than 40 meters, less than 30 meters, or less than 20 meters.

Transfer structure 40 may include and/or be any suitable structure that may be adapted, configured, designed, and/or constructed to support elongate horizontal support structure 30 and/or to transfer, translate, and/or convey elongate horizontal support structure 30. As a more specific example, transfer structure 40 may be configured to suspend, or selectively suspend, elongate horizontal support structure 30 above ground surface 80. As additional more specific examples, transfer structure 40 may be configured to operatively translate elongate horizontal support structure 30 in a vertical, or at least substantially vertical, direction and/or in a horizontal, or at least substantially horizontal, direction. Examples of transfer structure 40 include any suitable hoist, crane, and/or gantry crane.

Vertical linkages 50 may include and/or be any suitable structure that may have, or extend between, upper end 51 and lower end 52, that may be operatively attached to elongate horizontal support structure 30, that may extend from elongate horizontal support structure 30, that may be operatively attached to vacuum chucks 100, and/or that may operatively link vacuum chucks 100 to elongate horizontal support structure 30. As illustrated in FIGS. 3-4, vertical linkages 50 generally extend vertically, or least substantially vertically, below elongate horizontal support structure 30; however, this is not required.

Each vertical linkage 50 may be suspended from elongate horizontal support structure 30 via a respective pivotal linkage 60. Pivotal linkages 60 may be configured to permit rotation of vertical linkages 50 relative to elongate horizontal support structure 30 about a pivot axis. The pivot axis may be perpendicular, or at least substantially perpendicular, to longitudinal axis 32 of elongate horizontal support structure 30 and/or perpendicular, or at least substantially perpendicular, to a vertical direction (such as the Z-direction in FIGS. 3-4). As an example, the pivot axis may be parallel, or at least substantially parallel, to the X-direction in FIGS. 3-4.

Vertical linkages 50 may be adapted, configured, designed, and/or constructed to be variable length vertical linkages 50. As such, vertical linkages 50 may be configured to be adjusted among a plurality of different lengths. This adjustment may change a distance between upper end 51 and lower end 52 and/or may change a distance between a respective chuck 100 and elongate horizontal support structure 30. Additionally or alternatively, this adjustment also may be utilized to align, or to permit alignment of, a respective vacuum chuck 100 with a corresponding, or respective, portion of vertical surface 92, as discussed. Furthermore, this adjustment may permit system 20 to be adjusted such that vacuum chucks 100 may be aligned with different flexible elongate bodies 90 of differing shapes.

Examples of vertical linkages 50 include any suitable linear actuator, rack and pinion assembly, lead screw and nut assembly, linear motor, and/or gas lock spring. It is within the scope of the present disclosure that the length of vertical linkages 50 may be adjusted in any suitable manner. As examples, vertical linkages 50 may be configured to be manually adjusted among the plurality of different lengths, electrically adjusted among the plurality of different lengths, mechanically adjusted among the plurality of different lengths, pneumatically adjusted among the plurality of different lengths, and/or hydraulically adjusted among the plurality of different lengths.

Flexible elongate body 90 may include and/or be any suitable structure that defines vertical surface 92, that may be selectively retained by vacuum chucks 100, and/or that may be transferred by system 20. As an example, flexible elongate body 90 may include and/or be an uncured composite layup, such as a thermoset composite layup. The uncured composite layup may include any suitable material and/or materials of construction. As examples, the uncured composite layup may include one or more of a fiberglass, a fiberglass cloth, a carbon fiber, a carbon fiber cloth, a cloth, a pre-impregnated (pre-preg) composite material, a resin material, and/or an epoxy.

As discussed, flexible elongate body 90 may be a large, or long, flexible elongate body. As examples, a length of flexible elongate body 90 may be at least 1 meter, at least 2 meters, at least 3 meters, at least 5 meters, at least 10 meters, at least 15 meters, at least 20 meters, or at least 25 meters. Additionally or alternatively, the length of flexible elongate body 90 also may be less than 50 meters, less than 40 meters, less than 30 meters, less than 20 meters, less than 10 meters, less than 8 meters, less than 6 meters, less than 5 meters, less than 4 meters, less than 3 meters, or less than 2 meters.

As additional examples, a height of flexible elongate body 90 may be at least 1 centimeter (cm), at least 2 cm, at least 3 cm, at least 4 cm, at least 5 cm, at least 6 cm, at least 8 cm, at least 10 cm, at least 15 cm, or at least 20 cm. Additionally or alternatively, the height of flexible elongate body 90 may be less than 50 cm, less than 40 cm, less than 30 cm, less than 25 cm, less than 20 cm, less than 15 cm, or less than 10 cm. Additionally or alternatively, flexible elongate body 90 may define an aspect ratio of at least 10:1, at least 20:1, at least 30:1, at least 40:1, at least 50:1, at least 60:1, at least 80:1, or at least 100:1.

Vertical surface 92 of flexible elongate body 90 may be a planar, or at least substantially planar, vertical surface 92. In addition, flexible elongate body 90 also may include and/or define an upper surface 94. In contrast with vertical surface 92, and as illustrated in FIG. 3, upper surface 94 may be nonlinear, or arcuate, along the length of flexible elongate body 90. Under these conditions, vertical surface 92 may be referred to herein as defining a nonlinear, or arcuate, trajectory in a direction that is parallel to vertical surface 92 and/or that is along the length of flexible elongate body 90.

Flexible elongate body 90 may have, or define, any suitable shape. As an example, flexible elongate body 90 may be a composite wing-grid spar for an aircraft. Under these conditions, flexible elongate body 90 may be shaped to define at least a portion of the composite wing-grid spar for the aircraft and may have an L-shaped, or at least substantially L-shaped, cross-sectional shape, as illustrated in FIG. 4.

As discussed, flexible elongate body 90 may include and/or be an uncured composite layup. Under these conditions, retaining vertical surface 92 of flexible elongate body 90 on vertically oriented vacuum surface 132 of vacuum chuck 100 during transfer of flexible elongate body 90 may serve to retain the above-described L-shaped cross-sectional shape of flexible elongate body 90. As an example, residual stresses within the uncured composite layup may tend to urge flexible elongate body 90 to and/or toward a flatter and/or more planar cross-sectional shape. However, when vertical surface 92 is retained on and supported by vertically oriented vacuum surface 132 of vacuum chuck 100, a gravitational force exerted on a portion of flexible elongate body 90 that defines upper surface 94 may counteract and/or oppose the residual stresses, thereby retaining the L-shaped cross-sectional shape of flexible elongate body 90 without the need to separately support upper surface 94 thereof.

Vacuum chucks 100 may include and/or be any suitable structure that may be adapted, configured, designed, and/or constructed to selectively retain the respective portion of vertical surface 92 of flexible elongate body 90. As used herein, the phrase, "selectively retain" means that vacuum chucks 100 are configured to selectively, repeatedly, and/or reversibly be operatively attached, or affixed, to vertical surface 92 and subsequently removed from vertical surface 92, such as to permit system 20 to transfer a first flexible elongate body 90 and subsequently to transfer a second flexible elongate body 90.

As discussed, vacuum chucks 100 include lift supports 104 and are operatively attached to lower end 52 of vertical linkages 50 via lift supports 104. Lift supports 104 may be configured to permit rotation of vacuum chucks 100 relative to vertical linkages 50 about a vacuum chuck rotational axis. The vacuum chuck rotational axis may be parallel, or at least substantially parallel, to the pivot axis of pivotal linkages 60. Additionally or alternatively, the rotational axis may be perpendicular to longitudinal axis 32 and/or perpendicular to the vertical direction (i.e., the Z-direction in FIGS. 3-4).

Vacuum chucks 100 may selectively retain the respective portion of vertical surface 92 in any suitable manner. As an example, systems 20 may apply a retention vacuum to an interface 96 between vacuum chucks 100 and vertical surface 92 (as illustrated in FIG. 4), and this retention vacuum may selectively retain the respective portion of vertical surface 92 on a given vacuum chuck 100. More specific examples of vacuum chucks 100 are illustrated in FIGS. 5-17 and discussed in more detail herein with reference thereto.

Vacuum chucks 100 of FIGS. 5-17 may include and/or be vacuum chucks 100 of FIGS. 3-4, and any of the structures, features, and/or components of vacuum chucks 100 that are discussed herein with reference to FIGS. 5-17 may be included in and/or utilized with systems 20 of FIGS. 3-4 without departing from the scope of the present disclosure. Similarly, any of the structures, features, and/or components of vacuum chucks 100 of FIGS. 3-4 may be included in and/or utilized with vacuum chucks 100 of FIGS. 5-17 without departing from the scope of the present disclosure.

FIG. 5 is a schematic representation of examples of vacuum chucks 100 according to the present disclosure. Vacuum chucks 100 also may be referred to herein as chucks 100 and/or as end effectors 100.

As illustrated in FIG. 5, chuck 100 includes an elongate rigid support 120 and at least one vertically oriented vacuum surface 132. Vertically oriented vacuum surface 132 includes a plurality of vacuum holes 134. Vertically oriented vacuum surface 132 extends along a length of elongate rigid support 120 (as perhaps illustrated more clearly in FIGS. 7-8) and is supported by elongate rigid support 120. In addition, vertically oriented vacuum surface 132 is configured to contact a vertical surface 92 of a flexible elongate body 90 during transfer of flexible elongate body 90 by chuck 100.

Chuck 100 also includes a vacuum manifold 160. Vacuum manifold 160 is in fluid communication with vacuum holes 134 and is configured to apply a retention vacuum 78 to vacuum holes 134. Application of retention vacuum 78 to vacuum holes 134 creates a pressure differential across flexible elongate body 90 and thereby selectively retains flexible elongate body 90 on vertically oriented vacuum surface 132. This selective retention may be utilized to permit and/or facilitate transfer of flexible elongate body 90 by chuck 100 and/or by a system 20 that includes chuck 100, as discussed in more detail herein with reference to FIGS. 3-4.

It is within the scope of the present disclosure that chuck 100 may include a single vacuum manifold 160 that is in fluid communication with all vacuum holes 134 that may be defined on a given vertically oriented vacuum surface 132. Alternatively, and as discussed in more detail herein with reference to FIGS. 15-17, it is also within the scope of the present disclosure that vacuum chuck 100 may include a plurality of discrete, distinct, and/or independent vacuum manifolds 160 that may be in fluid communication with respective independent regions 133 of the given vertically oriented vacuum surface 132. Under these conditions, the independent vacuum manifolds 160 may permit independent control of the application of the retention vacuum and/or the vacuum level that is applied to independent regions 133 of vertically oriented vacuum surface 132.

Chuck 100 further includes a skirt seal 170. Skirt seal 170 extends along a length of vertically oriented vacuum surface 132. In addition, skirt seal 170 is sized and/or located to form a fluid seal, or an at least partial fluid seal, with flexible elongate body 90. This fluid seal may restrict fluid flow therepast, and thereby may resist peeling of flexible elongate body 90 from vertically oriented vacuum surface 132 when flexible elongate body 90 is in contact with vertically oriented vacuum surface 132 and retention vacuum 78 is applied to vacuum holes 134.

Skirt seal 170 may include and/or be any suitable structure that may extend, or extend horizontally, along the length, or the entire length, of vertically oriented vacuum surface 132 and/or that may form the fluid seal with flexible elongate body 90. As an example, skirt seal 170 may include and/or be a sheet of flexible material. As more specific examples, skirt seal 170 may include and/or be a thin sheet of rubber, a thin sheet of polymer, a thin sheet of silicone rubber, and/or a thin elastomeric sheet. Skirt seal 170 also may be referred to herein as a sheet seal 170, a flexible seal 170, a linear seal 170, and/or a drape seal 170.

Skirt seal 170 may be adapted, configured, designed, sized, constructed, and/or located to form the fluid seal with and/or to restrict fluid flow past an upper surface 94 of flexible elongate body 90, to restrict fluid flow at an interface 174 between upper surface 94 and skirt seal 170, and/or to restrict fluid flow to an interface 96 between chuck 100 (and/or vertically oriented vacuum surface 132 thereof) and flexible elongate body 90.

As discussed in more detail herein, upper surface 94 may be nonlinear, nonplanar, and/or arcuate along the length of flexible elongate body 90, and skirt seal 170 may form the fluid seal therewith despite this nonlinear, nonplanar, and/or arcuate shape. As an example, and as illustrated, skirt seal 170 may at least partially overlap and/or overhang flexible elongate body 90 and/or upper surface 94 thereof. Under these conditions, an amount of overlap between flexible elongate body 90 and skirt seal 170 may vary along a length of skirt seal 170, such as may be due to the nonlinear shape of upper surface 94. This overlap and/or overhang also may permit skirt seal 170 to form the fluid seal with a plurality of different flexible elongate bodies 90 that have, or define, a plurality of different shapes for respective upper surfaces 94.

As illustrated in dashed lines in FIG. 5, chuck 100 also may include one or more side seals 180 and/or one or more lower seals 184. Side seals 180 may extend along (or proximal) an end of vertically oriented vacuum surface 132 and/or along (or proximal) an end of flexible elongate body 90 and may be configured to contact flexible elongate body 90 and to restrict fluid flow therepast. This may include restricting fluid flow between side seal 180 and the end of flexible elongate body 90. It is within the scope of the present disclosure that chuck 100 may include a first side seal and a second side seal. The first side seal may extend along, form a fluid seal with, and/or restrict fluid flow past a first side of flexible elongate body 90, while the second side seal may extend along, form the fluid seal with, and/or restrict fluid flow past a second side of flexible elongate body 90.

Lower seal 184 may extend along the length of vertically oriented vacuum surface 132. In addition, lower seal 184 may be configured to contact a lower edge of flexible elongate body 90 and to restrict fluid flow therepast. This may include restricting fluid flow between lower seal 184 and the lower edge of flexible elongate body 90. Side seal 180 and/or lower seal 184 may include any suitable structure, an example of which is a lip seal. Thus, side seal 180 also may be referred to herein as a side lip seal 180. Additionally or alternatively, lower seal 184 also may be referred to herein as a lower lip seal 184.

As also illustrated in dashed lines in FIG. 5, chuck 100 further may include an auxiliary retention mechanism 190. Auxiliary retention mechanism 190 may be configured to supplement retention vacuum 78 and/or to prevent separation, or at least complete separation, of flexible elongate body 90 from vertically oriented vacuum surface 132. Auxiliary retention mechanism 190 may include at least a retaining conformation and a released conformation. In the retaining conformation, auxiliary retention mechanism 190 restricts separation of flexible elongate body 90 from vacuum chuck 100. In the released conformation, auxiliary retention mechanism 190 permits separation of flexible elongate body 90 from chuck 100. Auxiliary retention mechanism 190 may include and/or be any suitable structure. As an example, auxiliary retention mechanism 190 may include and/or be a retention strap. As another example, auxiliary retention mechanism 190 may include and/or be a pivotal auxiliary retention mechanism that pivots between the retaining conformation and the released conformation.

As further illustrated in dashed lines in FIG. 5, chuck 100 may include a lift support 104. Lift support 104 may be configured to operatively attach chuck 100 to any suitable structure, such as to a lift mechanism and/or to vertical linkage 50 of FIGS. 3-4. As illustrated, lift support 104 may be located on, near, or proximal, an upper side 136 of chuck 100 and/or of vertically oriented vacuum surface 132 thereof. In addition, lift support 104 may be centered, or at least substantially centered, along a length of elongate rigid support 120 and/or may be operatively attached, or even directly attached, to elongate rigid support 120.

As also illustrated in dashed lines in FIG. 5, chuck 100 may include, may be associated with, and/or may be in fluid communication with a vacuum source 76. Vacuum source 76 may be in fluid communication with vacuum manifold 160 and/or may be configured to selectively apply retention vacuum 78 to holes 134 via vacuum manifold 160.

As illustrated in dashed lines in FIG. 5, chuck 100 may include a plurality of vertically oriented vacuum surfaces 132, such as a first vertically oriented vacuum surface 141 and a second vertically oriented vacuum surface 142. Such a configuration may permit chuck 100 to retain and/or transfer two different flexible elongate bodies 90 at the same time. This may include retaining and/or transferring a first flexible elongate body with first vertically oriented vacuum surface 141 and retaining and/or transferring a second flexible elongate body with second vertically oriented vacuum surface 142.

When chuck 100 includes first vertically oriented vacuum surface 141 and second vertically oriented vacuum surface 142, the two vertically oriented vacuum surfaces may face away from one another and/or may face in opposed directions, as illustrated. In addition, elongate rigid support 120 may extend between, or at least partially between, first vertically oriented vacuum surface 141 and second vertically oriented vacuum surface 142. As illustrated, a first skirt seal 171 may be associated with first vertically oriented vacuum surface 141, while a second skirt seal 172 may be associated with second vertically oriented vacuum surface 142.

As also illustrated in dashed lines in FIG. 5, chuck 100 may include a plurality of vacuum manifolds 160, such as a first vacuum manifold 161 and a second vacuum manifold 162. First vacuum manifold 161 may be in fluid communication with and/or may be configured to apply a first retention vacuum 78 to a first plurality of vacuum holes 151 that may be associated with first vertically oriented vacuum surface 141, while second vacuum manifold 162 may be in fluid communication with and/or may be configured to apply a second retention vacuum 78 to a second plurality of vacuum holes 152 that may be associated with second vertically oriented vacuum surface 142. Chuck 100 and/or vacuum source 76 may be configured to apply the first retention vacuum separately and/or independently from the second retention vacuum to thereby permit independent retention of the first flexible elongate body by first vertically oriented vacuum surface 141 and the second flexible elongate body by second vertically oriented vacuum surface 142.

Elongate rigid support 120 may include any suitable structure that may at least partially support vertically oriented vacuum surface 132. As an example, elongate rigid support 120 may include and/or be a tubular elongate rigid support 132. As another example, elongate rigid support 120 may include and/or be a metallic elongate rigid support 132, which may be formed from a metal, aluminum, and/or steel. Additionally or alternatively, a material of construction of elongate rigid support 120 may be selected (or elongate rigid support 120 may be configured) to deflect less than a threshold amount responsive to supporting a weight of flexible elongate body 90 (or the first flexible elongate body and the second flexible elongate body). Examples of the threshold amount include threshold amounts of less than 10 millimeters (mm), less than 8 mm, less than 6 mm, less than 4 mm, less than 2 mm, less than 1 mm, less than 0.5 mm, less than 0.1 mm, less than 0.05 mm, or less than 0.01 mm.

Elongate rigid support 120 and/or vertically oriented vacuum surface 132 that is supported thereby may have, or define, any suitable length. As examples, the length of elongate rigid support 120 and/or of vertically oriented vacuum surface 132 may be at least 1 meter, at least 2 meters, at least 3 meters, at least 5 meters, at least 10 meters, at least 15 meters, at least 20 meters, or at least 25 meters. Additionally or alternatively, the length of elongate rigid support 120 and/or of vertically oriented vacuum surface 132 may be less than 50 meters, less than 40 meters, less than 30 meters, less than 20 meters, less than 10 meters, less than 8 meters, less than 6 meters, less than 5 meters, less than 4 meters, less than 3 meters, or less than 2 meters.

Vacuum manifold 160 may include and/or be any suitable structure that may be adapted, configured, designed, and/or constructed to apply retention vacuum 78 to vacuum holes 134. Vacuum manifold 160 is illustrated in dashed lines in FIG. 5 to indicate that vacuum manifold 160 may be at least partially, or even completely, defined by elongate rigid support 120. Additionally or alternatively, vacuum manifold 160 also may include a vacuum conduit 164 that is separate from and/or external to elongate rigid support 120.

Vertically oriented vacuum surface 132 may be defined by any suitable structure. As an example, vertically oriented vacuum surface 132 may be at least partially, or even completely, defined by elongate rigid support 120. As another example, and as illustrated in dashed lines in FIG. 5, vertically oriented vacuum surface 132 may be at least partially, or even completely, defined by a body 130 that may be operatively attached to elongate rigid support 120. An example of body 130 is discussed in more detail herein with reference to FIG. 6.

As illustrated in solid lines in FIG. 5, elongate rigid support 120 may completely support and/or define vertically oriented vacuum surface 132. Alternatively, and as illustrated in dashed lines in FIG. 5, at least a portion of vertically oriented vacuum surface 132 may extend from and/or may not be supported by elongate rigid support 120.

Vertically oriented vacuum surface 132 may have, or define, any suitable height. As examples, the height of vertically oriented vacuum surface 132 may be at least 1 centimeter (cm), at least 2 cm, at least 3 cm, at least 4 cm, at least 5 cm, at least 6 cm, at least 8 cm, at least 10 cm, at least 15 cm, or at least 20 cm. Additionally or alternatively, the height of vertically oriented vacuum surface 132 also may be less than 100 cm, less than 80 cm, less than 70 cm, less than 60 cm, less than 50 cm, less than 40 cm, less than 30 cm, less than 25 cm, less than 20 cm, less than 15 cm, or less than 10 cm. Additionally or alternatively, vertically oriented vacuum surface 132 may define an aspect ratio of at least 5:1, at least 10:1, at least 15:1, at least 20:1, at least 25:1, at least 30:1, at least 40:1, or at least 50:1.

Regardless of the actual height of vertically oriented vacuum surface 132, dimensions of vertically oriented vacuum surface 132 may be, or may be selected to be, sufficient to support vertical surface 92 of flexible elongate body 90 and/or to prevent deformation of vertical surface 92 during transfer of flexible elongate body 90. Additionally or alternatively, the height of vertically oriented vacuum surface 132 may be, or may be selected to be, sufficient to provide a vacuum force that retains flexible elongate body 90 thereon when retention vacuum 78 is applied to interface 96. As examples, the height of vertically oriented vacuum surface 132 may be at least 50%, at least 60%, at least 70%, at least 80%, at least 90%, at least 100%, at least 110%, at least 120%, at least 130%, at least 140%, or at least 150% of a height of vertical surface 92 of flexible elongate body 90.

Figure 6:
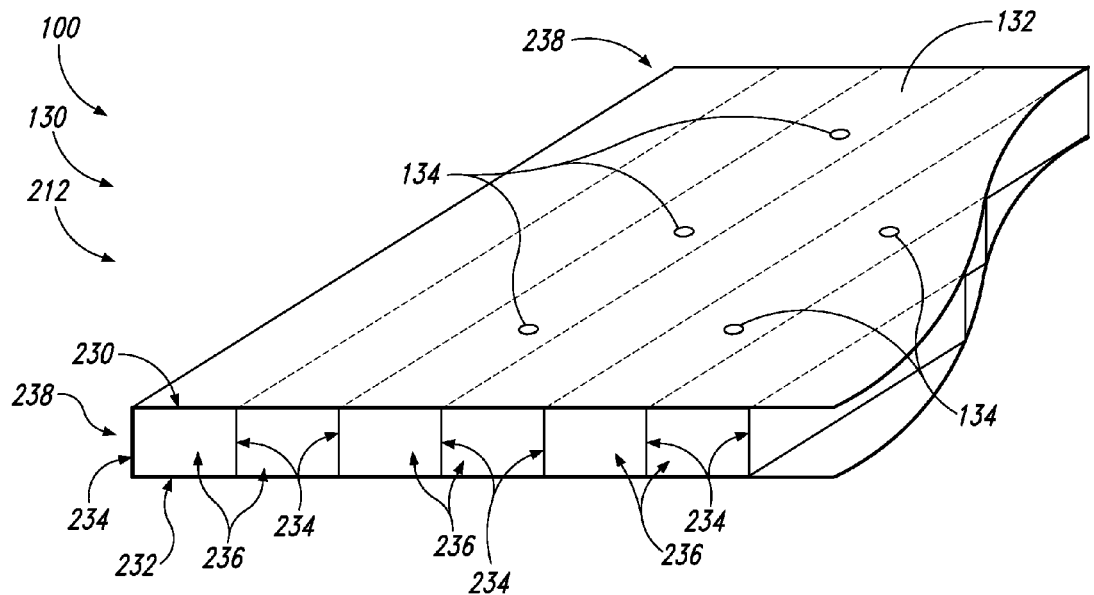
FIG. 6 is a schematic fragmentary view of examples of a body that may define a vertically oriented vacuum surface according to the present disclosure.

FIG. 6 is a schematic fragmentary view of examples of a body 130 that may define vertically oriented vacuum surface 132 of vacuum chucks 100 according to the present disclosure. Body 130 also may be referred to herein as a panel 212 and/or as a double walled panel 212 and may be formed from any suitable material. As examples, body 130 may be formed from and/or may include a polymeric material and/or a polycarbonate.

Body 130 includes a first planar wall 230, a second, opposed planar wall 232, and a plurality of elongate webs 234 that extend between first planar wall 230 and second planar wall 232. First planar wall 230 may define vertically oriented vacuum surface 132 of chucks 100, while second planar wall 232 may be operatively attached to elongate rigid support 120 of chucks 100. Planar walls 230 and 232, together with the plurality of elongate webs 234, define a plurality of elongate channels 236 that extend within body 130. It is within the scope of the present disclosure that channels 236 may extend along a longitudinal axis that is parallel to first planar wall 230 and/or second planar wall 232, may extend from an edge 238 of body 130, may extend from a first edge of body 130 to a second edge of body 130, and/or may extend between two opposed edges of body 130.

First planar wall 230 also may define vacuum holes 134. Each vacuum hole 134 may be in fluid communication with one or more selected elongate channels 236, which may form a portion of vacuum manifold 160 of FIG. 5.

Figure 7:
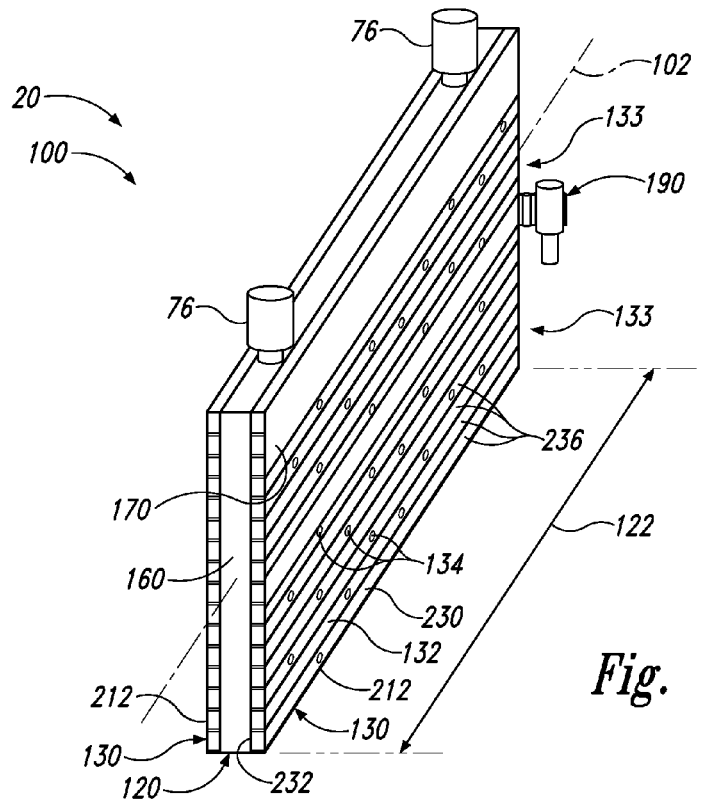
FIG. 7 is a less schematic profile view of a vacuum chuck according to the present disclosure.
Figure 8:
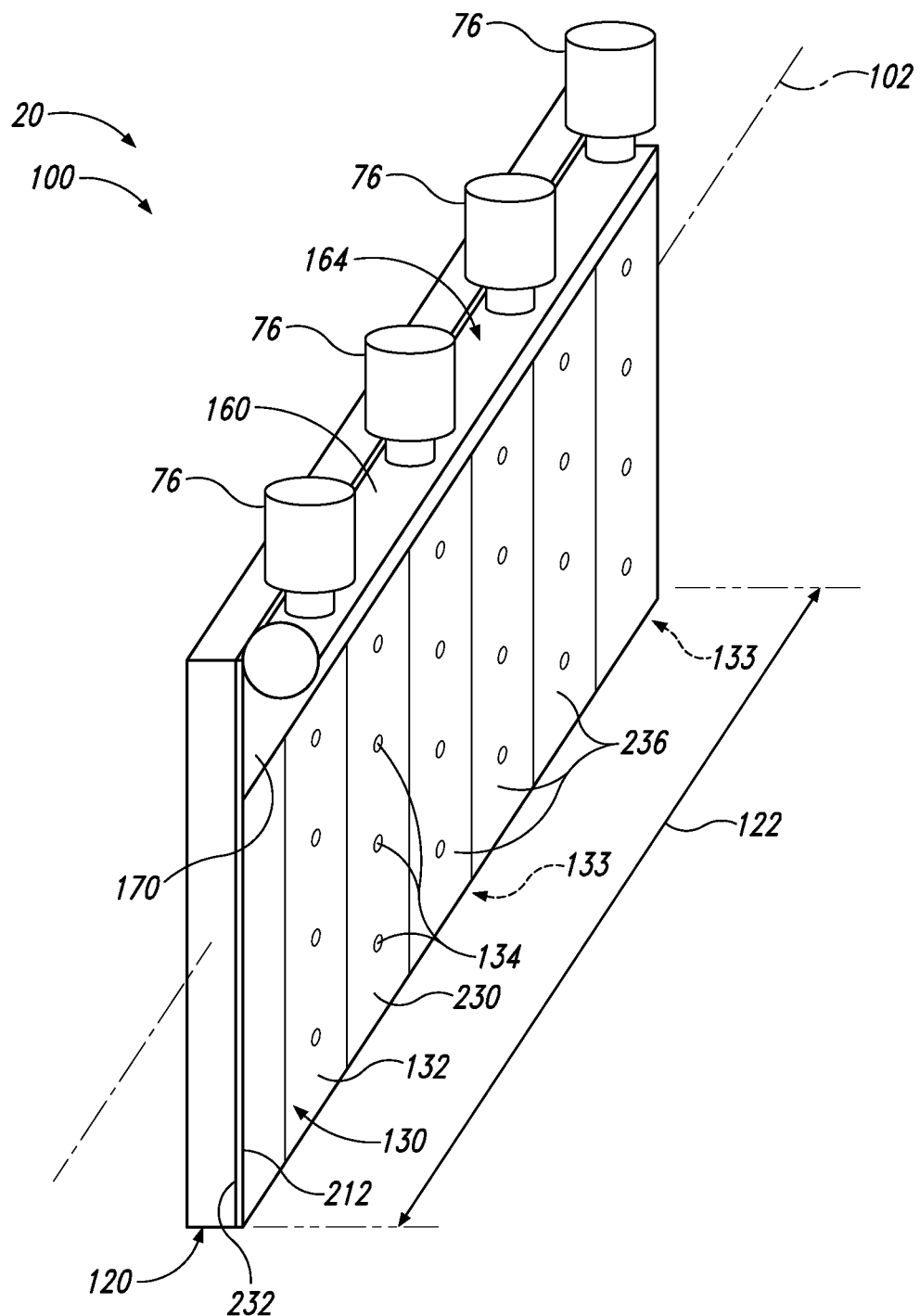
FIG. 8 is a less schematic profile view of a vacuum chuck according to the present disclosure.

FIGS. 7-8 are less schematic profile views of vacuum chucks 100, according to the present disclosure, that may be included in and/or may form a portion of systems 20. As illustrated in FIGS. 7-8, chucks 100 include an elongate rigid support 120 and at least one body 130, in the form of a double walled panel 212, that is supported by and/or operatively attached to elongate rigid support 120. Body 130 defines a vertically oriented vacuum surface 132 that includes a plurality of vacuum holes 134. As discussed, vertically oriented vacuum surface 132 extends along a length 122 of elongate rigid support 120.

Chucks 100 of FIGS. 7-8 also include a vacuum manifold 160 and one or more vacuum sources 76. As illustrated in FIGS. 7-8, vacuum sources 76 may be lightweight and/or modular vacuum sources that may be attached, or directly attached to chuck 100 and/or to vacuum manifold 160 thereof. In addition, each vacuum source 76 may be configured to independently apply the retention vacuum to a respective region 133 of vertically oriented vacuum surface 132, as discussed herein.

Vacuum manifold 160 provides fluid communication between vacuum sources 76 and vacuum holes 134. FIG. 7 illustrates vacuum manifold 160 as being at least partially defined by elongate rigid support 120. Under these conditions, the ends of elongate channels 236 may be sealed and second planar wall 232 may include holes to permit fluid communication between elongate channels 236 and vacuum manifold 160. In contrast, FIG. 8 illustrates vacuum manifold 160 as being at least partially defined by a vacuum conduit 164 that is external to elongate rigid support 120. Under these conditions, one end of elongate channels 236 may be sealed and vacuum conduit 164 may be in fluid communication with the other end of elongate channels 236.

Chucks 100 of FIGS. 7-8 further include a skirt seal 170 that extends along length 122 of elongate rigid support 120. In addition, chuck 100 of FIG. 7 includes an auxiliary retention mechanism 190, in the form of a retention strap, which may be selectively extended along the length of elongate rigid support 120.

When vertically oriented vacuum surface 132 is defined by body 130 in the form of double walled panel 212, it is within the scope of the present disclosure that elongate channels 236 of double walled panel 212 may extend in any suitable direction and/or with any suitable orientation relative to elongate rigid support 120. As an example, and as illustrated in FIG. 7, elongate channels 236 may extend in a horizontal, or at least substantially horizontal, direction and/or may extend parallel, or at least substantially parallel, to a longitudinal axis 102 of chuck 100. As another example, and as illustrated in FIG. 8, elongate channels 236 may extend in a vertical, or at least substantially vertical, direction and/or may extend perpendicular, or at least substantially perpendicular, to longitudinal axis 102 of chuck 100.

FIGS. 9-13 are schematic cross-sectional views of vacuum chucks 100 according to the present disclosure and illustrate various relative configurations for elongate rigid supports 120 and bodies 130 that define vertically oriented vacuum surfaces 132. In FIGS. 9-13, chucks 100 are illustrated as including an elongate rigid support 120 and a body 130 that is operatively attached to elongate rigid support 120 and that defines a vertically oriented vacuum surface 132. Chucks 100 also are illustrated as including a lift support 104 that is operatively attached to elongate rigid support 120 and is configured to permit chucks 100 to be suspended thereby. Elongate rigid support 120 is a tubular structure that also defines at least a portion of a vacuum manifold 160, which is configured to provide a retention vacuum to vertically oriented vacuum surface 132. As such, elongate rigid support 120 includes an opening 126 that permits fluid communication between an internal volume 128, which is defined by elongate rigid support 120, and body 130.

Figure 9:
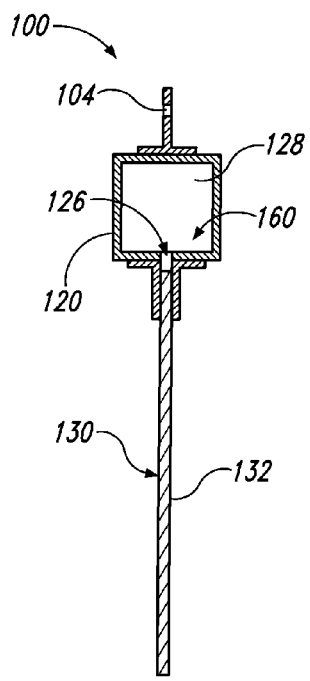
FIG. 9 is a schematic cross-sectional view of a vacuum chuck according to the present disclosure.
Figure 10:
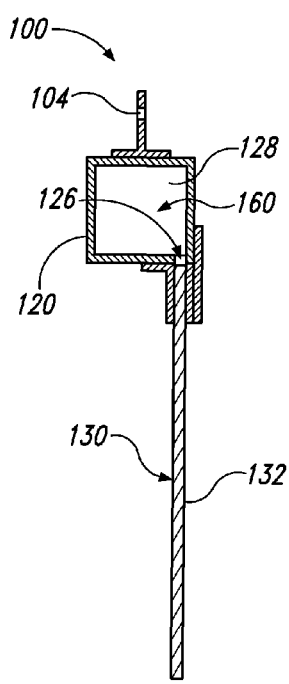
FIG. 10 is a schematic cross-sectional view of a vacuum chuck according to the present disclosure.

As illustrated in FIGS. 9-10, an end of body 130 may be operatively attached to elongate rigid support 120 and body 130 may be suspended from elongate rigid support such that vertically oriented vacuum surface 132 may not be directly supported by elongate rigid support 120. In such a configuration, body 130 may be configured to permit limited deformation and/or flexing along a length thereof. In FIG. 9, body 130 is centered on elongate rigid support 120 and/or is located vertically below lift support 104. In FIG. 10, body 130 is located proximal an edge, or side, of elongate rigid support 120, is offset from a center of elongate rigid support 120, and/or is offset from lift support 104.

Figure 11:
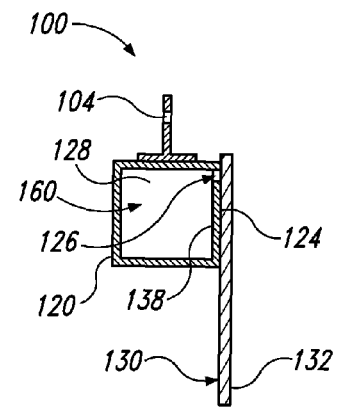
FIG. 11 is a schematic cross-sectional view of a vacuum chuck according to the present disclosure.
Figure 12:
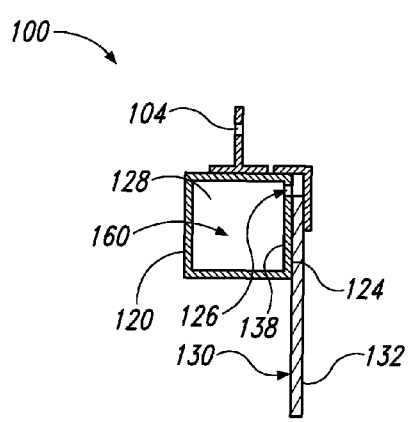
FIG. 12 is a schematic cross-sectional view of a vacuum chuck according to the present disclosure.
Figure 13:
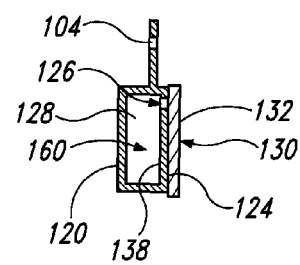
FIG. 13 is a schematic cross-sectional view of a vacuum chuck according to the present disclosure.

As illustrated in FIGS. 11-13, a face, or side, 138 of body 130 additionally or alternatively may be operatively attached to a surface 124 that is defined by elongate rigid support 120. In FIGS. 11-12, face 138 of body 130 is only partially supported by and/or attached to elongate rigid support 120, while in FIG. 13, face 138 of body 130 is completely (or at least substantially completely) supported by and/or attached to elongate rigid support 120.

Figure 14:
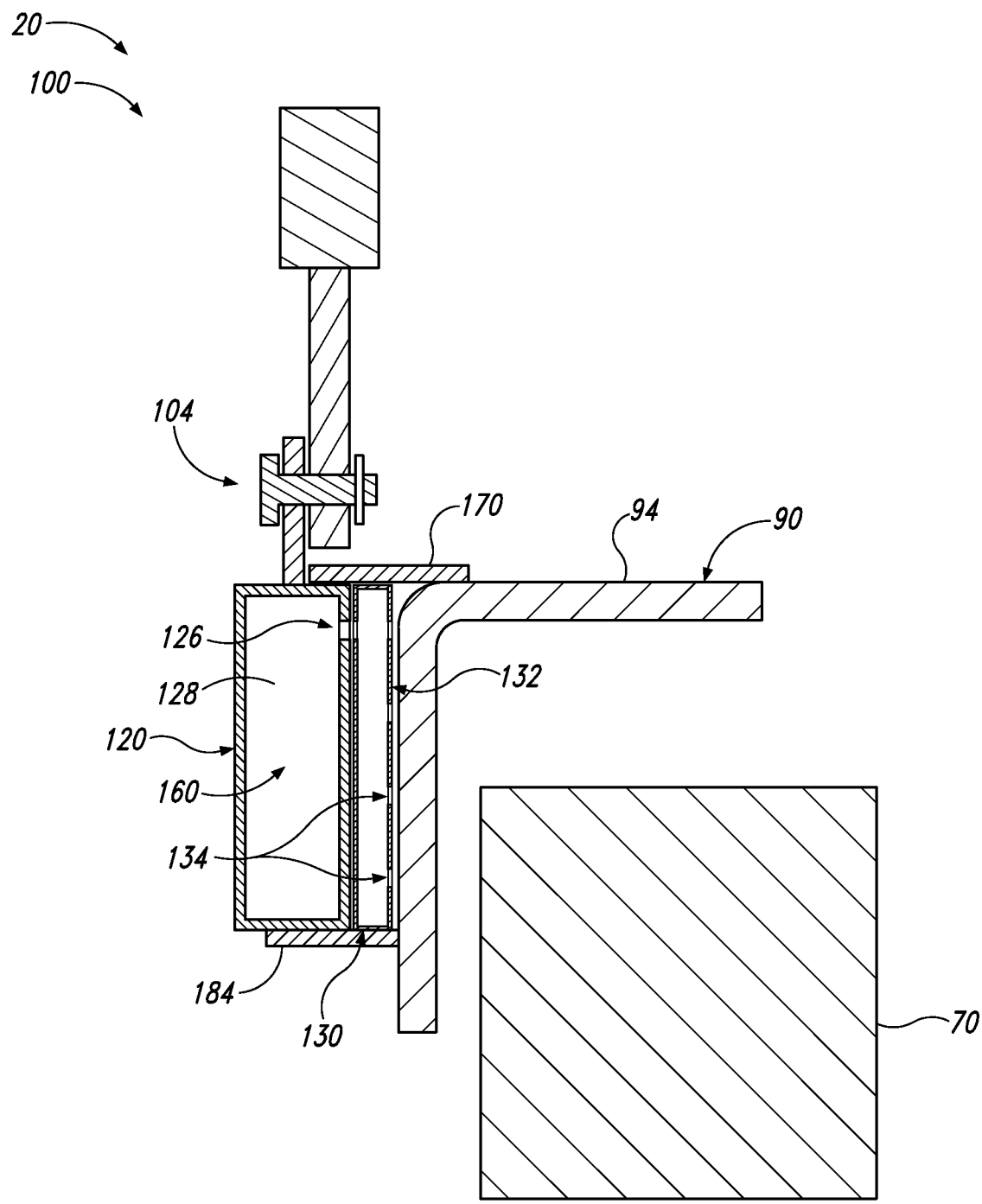
FIG. 14 is a schematic cross-sectional view of a vacuum chuck, according to the present disclosure, retaining a flexible elongate body.

FIG. 14 is a schematic cross-sectional view of a vacuum chuck 100, according to the present disclosure, retaining a flexible elongate body 90. In FIG. 14, a retention vacuum has been applied to a vacuum manifold 160, thereby retaining flexible elongate body 90 on a vertically oriented vacuum surface 132 of chuck 100 and permitting flexible elongate body 90 to be separated from a support surface 70 and/or transferred by chuck 100. In addition, a skirt seal 170 extends from chuck 100 and across an upper surface 94 of flexible elongate body 90 and restricts fluid flow therebetween. A lower seal 184 also extends into contact with flexible elongate body 90 and restricts fluid flow therebetween.

Figure 15:
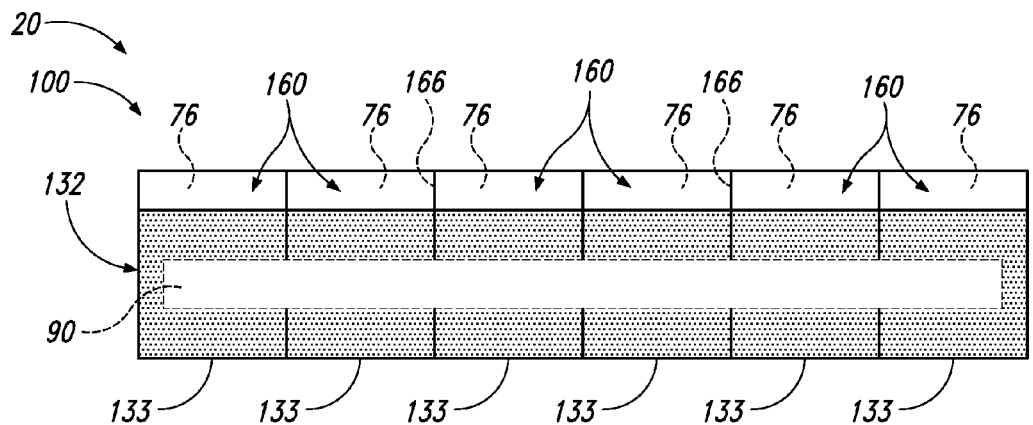
FIG. 15 is a schematic side view of a vacuum chuck, according to the present disclosure, that includes a vertically oriented vacuum surface with a plurality of independent regions.
Figure 16:
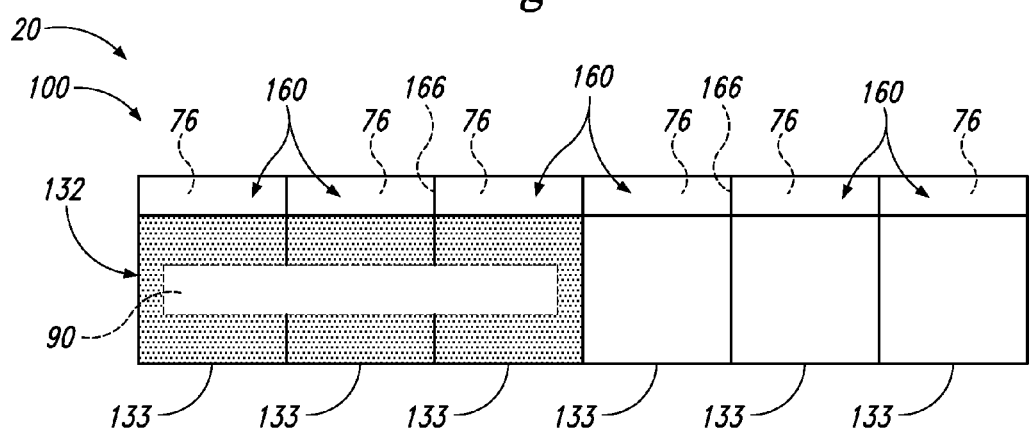
FIG. 16 is a schematic side view of a vacuum chuck, according to the present disclosure, that includes a vertically oriented vacuum surface with a plurality of independent regions.
Figure 17:
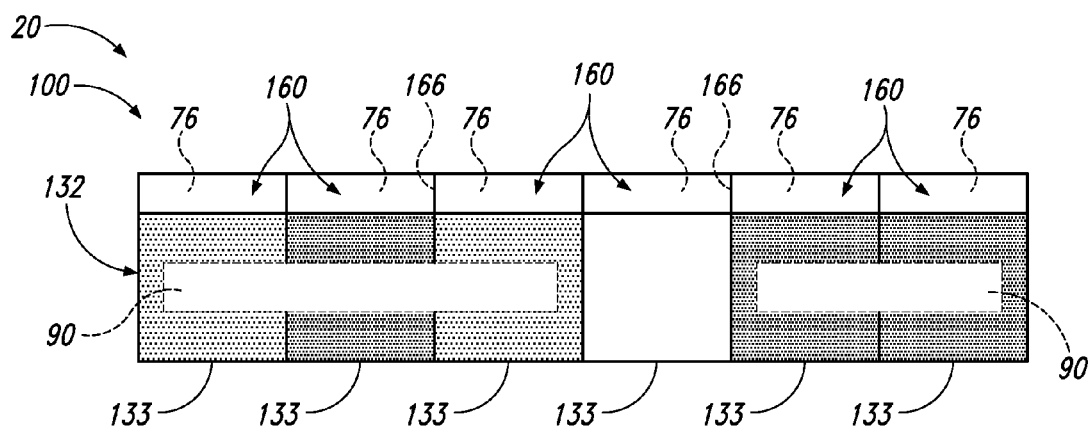
FIG. 17 is a schematic side view of a vacuum chuck, according to the present disclosure, that includes a vertically oriented vacuum surface with a plurality of independent regions.

FIGS. 15-17 are schematic side views of vacuum chucks 100, according to the present disclosure, that include vertically oriented vacuum surfaces 132 with a plurality of independent regions 133. Each region 133 may be associated with and/or in fluid communication with a respective independent vacuum manifold 160, and vacuum manifolds 160 may be configured to permit independent control of application of the retention vacuum to respective regions 133. This may include independent control of the presence and/or absence of the retention vacuum within a given region 133 and/or independent control of a level, or magnitude, of the retention vacuum that is applied to a given region 133.

As illustrated in FIG. 15, a flexible elongate body 90 that extends, at least substantially, along an entire length of chuck 100 may be retained on vertically oriented vacuum surface 132 through application of the retention vacuum to each region 133 of vertically oriented vacuum surface 132. This is illustrated by the dotted texture in each region 133 of vertically oriented vacuum surface 132.

Alternatively, and as illustrated in FIG. 16, when vacuum chuck 100 retains a flexible elongate body 90 that does not extend along the entire length of vertically oriented vacuum surface 132, a portion of the plurality of regions 133 that retains flexible elongate body 90 may have the retention vacuum applied thereto, as illustrated by the dotted texture in the three leftmost regions 133 of FIG. 16. However, a portion of the plurality of regions 133 that does not retain flexible elongate body 90 may not have the retention vacuum applied thereto, as illustrated by the absence of the dotted texture in the three rightmost regions 133 of FIG. 16. Such a configuration may decrease leakage of the retention vacuum and/or may decrease a power requirement of vacuum source 76.

As illustrated in FIG. 17, the plurality of regions 133 may be utilized to retain separate and/or distinct flexible elongate bodies 90 with chuck 100. In addition, and as also illustrated in FIG. 17 by variations in the density of the dotted texture, one or more regions 133 may have a different level of retention vacuum applied thereto when compared to one or more other regions 133.

The variation in application and/or magnitude of the retention vacuum in the various regions 133 may be accomplished in any suitable manner. As an example, each vacuum manifold 160 may have a separate and/or distinct vacuum source 76 associated therewith. As another example, a single vacuum source 76 may provide the retention vacuum to a plurality of vacuum manifolds 160, and one or more valves 166 may be utilized to control and/or regulate the application of the retention vacuum to a given vacuum manifold 160 and/or propagation of the retention vacuum between vacuum manifolds 160.

FIGS. 15-17 illustrate regions 133 of vertically oriented vacuum surface 132 as being spaced-apart horizontally and/or along a length of vertically oriented vacuum surface 132. However, this is not required in all embodiments. As an example, regions 133 additionally or alternatively may be spaced-apart vertically along a height of vertically oriented vacuum surface 132 (as illustrated in FIG. 7). In addition, FIGS. 15-17 also illustrate regions 133 as being, at least substantially, the same size and/or as having, at least substantially, the same surface area. However, this is not required in all embodiments. As an example, a first region 133 may have a different length and/or a different surface area than a second region 133.

Figure 18:
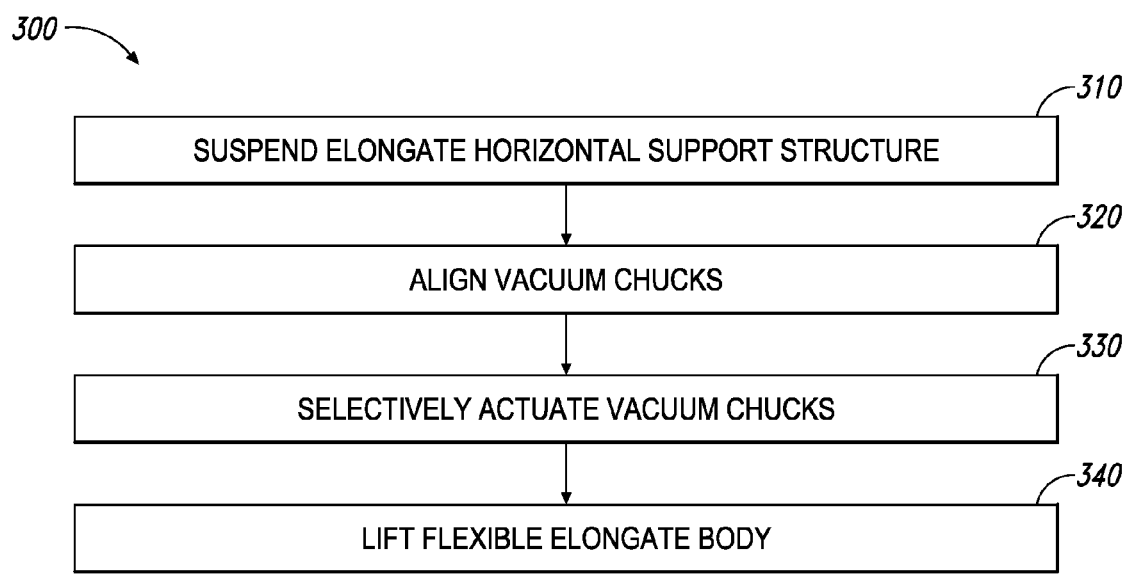
FIG. 18 is flowchart depicting methods, according to the present disclosure, of transferring a flexible elongate body.

FIG. 18 is a flowchart depicting methods 300, according to the present disclosure, of transferring a flexible elongate body. Methods 300 include suspending an elongate horizontal support structure at 310 and aligning a plurality of vacuum chucks at 320. Methods 300 further include selectively actuating the plurality of vacuum chucks at 330 and lifting the flexible elongate body at 340.

Suspending the elongate horizontal support structure at 310 may include suspending with a transfer structure. The elongate horizontal support structure may form a portion of a system for transferring the flexible elongate body and may be operatively attached to an upper end of each of a plurality of vertical linkages. Each of the plurality of vertical linkages may extend vertically, or at least substantially vertically, from and/or below the elongate horizontal support structure. In addition, the system further may include a plurality of vacuum chucks, and a respective vacuum chuck may be operatively attached to a lower end of each of the plurality of vertical linkages. Thus, the suspending at 310 further may include suspending the plurality of vertical linkages via that elongate horizontal support structure and/or suspending the plurality of vacuum chucks via the plurality of vertical linkages.

The suspending at 310 may be performed prior to the lifting at 340 and may include pre-deflecting the elongate horizontal support structure. This may decrease deflection and/or deformation of the elongate horizontal support structure during the lifting at 340 and/or may decrease deflection and/or deformation of the flexible elongate body subsequent to, during, and/or as a result of the lifting at 340.

The suspending at 310 may be accomplished in any suitable manner. As an example, the suspending at 310 may include moving the elongate horizontal support structure in a vertical direction with the transfer structure. This may include moving such that a weight of the elongate horizontal support structure, a weight of the plurality of vertical linkages, and a weight of the plurality of vacuum chucks are supported by the transfer structure.

Aligning the plurality of vacuum chucks at 320 may include aligning each of the plurality of vacuum chucks with a respective portion of a vertical surface of the flexible elongate body and may be accomplished in any suitable manner. As an example, the aligning at 320 may include rotating at least a portion of the plurality of vertical linkages relative to the elongate horizontal support structure. This may include rotating about a pivot axis that is perpendicular to a longitudinal axis of the elongate horizontal support structure and/or that is perpendicular to the vertical direction. As another example, the aligning at 320 may include rotating at least one of the plurality of vacuum chucks relative to a respective one of the plurality of vertical linkages. This may include rotating about a vacuum chuck rotational axis that is perpendicular to the longitudinal axis of the elongate horizontal support structure and/or that his perpendicular to the vertical direction. As yet another example, the aligning at 320 additionally or alternatively may include adjusting a length of at least one of the plurality of vertical linkages.

The aligning at 320 may include aligning such that a longitudinal axis of each of the plurality of vacuum chucks is aligned with, or at least substantially aligned with, a trajectory of the respective portion of the vertical surface of the flexible elongate body. Additionally or alternatively, the aligning at 320 also may include aligning such that a longitudinal axis of a first portion of the plurality of vacuum chucks is not aligned with and/or is at a skew angle relative to a longitudinal axis of a second portion of the plurality of vacuum chucks.

Selectively actuating the plurality of vacuum chucks at 330 may include selectively actuating each vacuum chuck to selectively retain the respective portion of the vertical surface of the flexible elongate body with the vacuum chuck. As an example, the selectively actuating at 330 may include selectively, operatively, and/or reversibly attaching each of the plurality of vacuum chucks to the respective portion of the vertical surface of the flexible elongate body. As another example, the selectively actuating at 330 may include applying a retention vacuum to an interface between each of the plurality of vacuum chucks and the respective portion of the vertical surface of the flexible elongate body.

Lifting the flexible elongate body at 340 may include lifting via translation of the horizontal support structure. Additionally or alternatively, the lifting at 340 also may include lifting such that the flexible elongate body is suspended from the plurality of vacuum chucks, is supported by the plurality of vacuum chucks, and/or is fully supported by the plurality of vacuum chucks. The lifting at 340 may be accomplished in any suitable manner. As an example, the lifting at 340 may include translating the elongate horizontal support structure in the vertical direction, translating the elongate horizontal support structure with the transfer structure, and/or translating the elongate horizontal support structure such that a weight of the flexible elongate body is supported by the elongate horizontal support structure.

Figure 19:
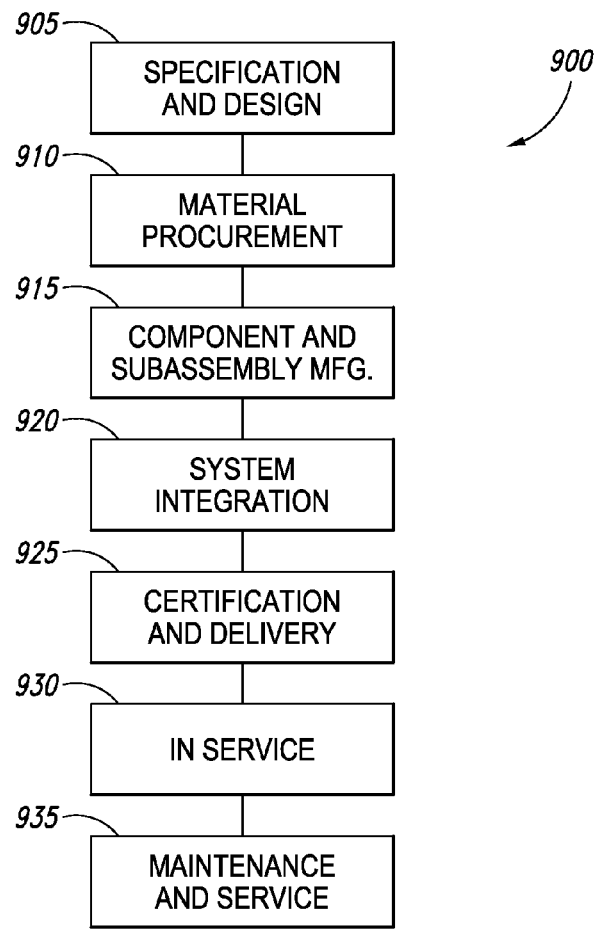
FIG. 19 is a flow diagram of aircraft production and service methodology.
Figure 20:
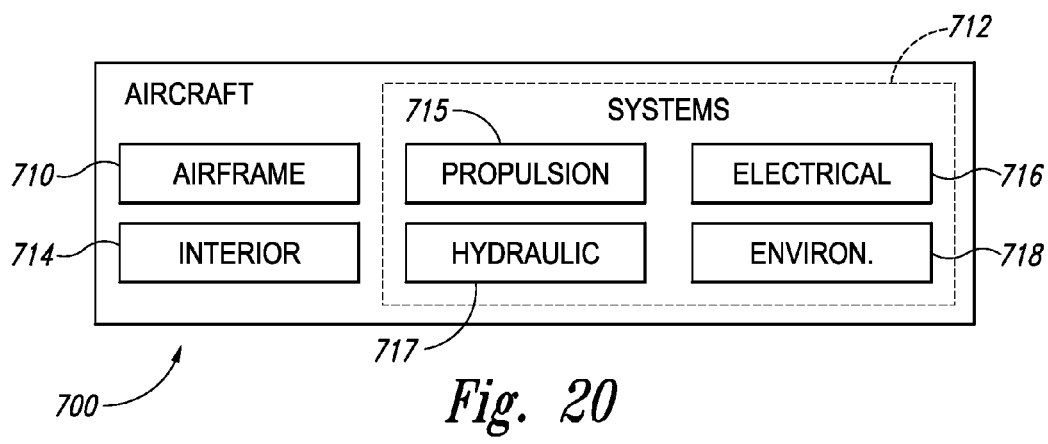
FIG. 20 is a block diagram of an aircraft.

Referring now to FIGS. 19-20, embodiments of the disclosure may be described in the context of an aircraft manufacturing and service method 900, as shown in FIG. 19, and/or an aircraft 700, as shown in FIG. 20. During pre-production, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Examples of inventive subject matter according to the present disclosure are described in the following enumerated paragraphs:

A1. A vacuum chuck for transferring a flexible elongate body, the vacuum chuck comprising:
  an elongate rigid support;
  a vertically oriented vacuum surface including a plurality of vacuum holes, wherein the vertically oriented vacuum surface extends along a length of the elongate rigid support, is supported by the elongate rigid support, and is configured to contact a vertical surface of the flexible elongate body during transfer of the flexible elongate body by the vacuum chuck;
  a vacuum manifold in fluid communication with the plurality of vacuum holes and configured to apply a retention vacuum to the plurality of vacuum holes to retain the flexible elongate body on the vertically oriented vacuum surface during transfer of the flexible elongate body by the vacuum chuck; and
  optionally, a skirt seal that extends along a length of the vertically oriented vacuum surface, optionally wherein the skirt seal is sized and located to form a fluid seal with the flexible elongate body and optionally to resist peeling of the flexible elongate body from the vertically oriented vacuum surface optionally when the flexible elongate body is in contact with the vertically oriented vacuum surface and the retention vacuum is applied to the plurality of vacuum holes.

A2. The vacuum chuck of paragraph A1, wherein the elongate rigid support is a tubular elongate rigid support.

A3. The vacuum chuck of any of paragraphs A1-A2, wherein the elongate rigid support is a metallic elongate rigid support, optionally wherein the metallic elongate rigid support is formed from at least one of a metal, aluminum, and steel.

A4. The vacuum chuck of any of paragraphs A1-A3, wherein the length of the elongate rigid support is at least one of:
  (i) at least 1 meter, at least 2 meters, at least 3 meters, at least 5 meters, at least 10 meters, at least 15 meters, at least 20 meters, or at least 25 meters; and
  (ii) less than 50 meters, less than 40 meters, less than 30 meters, less than 20 meters, less than 10 meters, less than 8 meters, less than 6 meters, less than 5 meters, less than 4 meters, less than 3 meters, or less than 2 meters.

A5. The vacuum chuck of any of paragraphs A1-A4, wherein the elongate rigid support is configured to deflect less than a threshold amount responsive to supporting a weight of the flexible elongate body, optionally wherein the threshold amount is less than 10 millimeters (mm), less than 8 mm, less than 6 mm, less than 4 mm, less than 2 mm, less than 1 mm, less than 0.5 mm, less than 0.1 mm, less than 0.05 mm, or less than 0.01 mm.

A6. The vacuum chuck of any of paragraphs A1-A5, wherein the vertically oriented vacuum surface is defined by the elongate rigid support.

A7. The vacuum chuck of any of paragraphs A1-A6, wherein the vertically oriented vacuum surface is defined by a body that is operatively attached to the elongate rigid support.

A8. The vacuum chuck of paragraph A7, wherein the body includes a first planar wall, a second planar wall, and a plurality of elongate webs that extend between the first planar wall and the second planar wall, wherein the second planar wall is operatively attached to the elongate rigid support, and further wherein the first planar wall defines the vertically oriented vacuum surface.

A9. The vacuum chuck of paragraph A8, wherein the first planar wall includes a plurality of perforations that defines the plurality of vacuum holes.

A10. The vacuum chuck of any of paragraphs A8-A9, wherein the body is a panel.

A11. The vacuum chuck of any of paragraphs A8-A10, wherein the body is a double-walled panel.

A12. The vacuum chuck of any of paragraphs A8-A11, wherein the first planar wall, the second planar wall, and the plurality of elongate webs define a plurality of elongate channels that optionally extends from an edge of the body, and further optionally extend between a first edge of the body and a second edge of the body.

A13. The vacuum chuck of any of paragraphs A8-A12, wherein the body defines a plurality of elongate channels that optionally extends from an edge of the body, and further optionally extends between a/the first edge of the body and a/the second edge of the body.

A14. The vacuum chuck of paragraph A13, wherein the plurality of elongate channels define at least a portion of the vacuum manifold.

A15. The vacuum chuck of any of paragraphs A13-A14, wherein a respective one of the plurality of elongate channels is in fluid communication with the vacuum manifold and with a respective portion of the plurality of holes and is configured to convey the retention vacuum from the vacuum manifold to the respective portion of the plurality of holes.

A16. The vacuum chuck of any of paragraphs A13-A15, wherein the plurality of elongate channels extends in a vertical, or at least substantially vertical, direction when the flexible elongate body is retained on the vertically oriented vacuum surface.

A17. The vacuum chuck of any of paragraphs A13-A16, wherein the plurality of elongate channels extends in a horizontal, or at least substantially horizontal, direction when the flexible elongate body is retained on the vertically oriented vacuum surface.

A18. The vacuum chuck of any of paragraphs A7-A17, wherein the body includes, and optionally is, a polycarbonate body.

A19. The vacuum chuck of any of paragraphs A1-A18, wherein the length of the vertically oriented vacuum surface is at least one of:

(i) at least 1 meter, at least 2 meters, at least 3 meters, at least 5 meters, at least 10 meters, at least 15 meters, at least 20 meters, or at least 25 meters; and (ii) less than 50 meters, less than 40 meters, less than 30 meters, less than 20 meters, less than 10 meters, less than 8 meters, less than 6 meters, less than 5 meters, less than 4 meters, less than 3 meters, or less than 2 meters.

A20. The vacuum chuck of any of paragraphs A1-A19, wherein a height of the vertically oriented vacuum surface is at least one of:

(i) at least 1 centimeter (cm), at least 2 cm, at least 3 cm, at least 4 cm, at least 5 cm, at least 6 cm, at least 8 cm, at least 10 cm, at least 15 cm, or at least 20 cm; and (ii) less than 100 cm, less than 80 cm, less than 70 cm, less than 60 cm, less than 50 cm, less than 40 cm, less than 30 cm, less than 25 cm, less than 20 cm, less than 15 cm, or less than 10 cm.

A21. The vacuum chuck of any of paragraphs A1-A20, wherein the vacuum manifold is at least partially defined by the elongate rigid support.

A22. The vacuum chuck of any of paragraphs A1-A21, wherein the vacuum manifold includes a vacuum conduit that is external to the elongate rigid support.

A23. The vacuum chuck of any of paragraphs A1-A22, wherein the skirt seal includes a sheet of flexible material.

A24. The vacuum chuck of any of paragraphs A1-A23, wherein the skirt seal includes at least one of a thin sheet of rubber, a thin sheet of polymer, a thin sheet of silicone rubber, and a thin elastomeric sheet.

A25. The vacuum chuck of any of paragraphs A1-A24, wherein the skirt seal is configured to restrict fluid flow past an upper surface of the flexible elongate body when the flexible elongate body is retained on the vertically oriented vacuum surface.

A26. The vacuum chuck of any of paragraphs A1-A25, wherein the skirt seal is configured to at least partially overlap with the flexible elongate body when the flexible elongate body is retained on the vertically oriented vacuum surface.

A27. The vacuum chuck of any of paragraphs A1-A26, wherein the skirt seal extends horizontally along the length, and optionally an entire length, of the vertically oriented vacuum surface.

A28. The vacuum chuck of any of paragraphs A1-A27, wherein the skirt seal is configured to form the fluid seal with an upper surface of the flexible elongate body.

A29. The vacuum chuck of paragraph A28, wherein the upper surface of the flexible elongate body is nonplanar, and optionally arcuate, along a length of the flexible elongate body.

A30. The vacuum chuck of any of paragraphs A1-A29, wherein the skirt seal is configured to overhang an/the upper surface of the flexible elongate body.

A31. The vacuum chuck of any of paragraphs A1-A30, wherein the skirt seal is configured to form the fluid seal with a plurality of different flexible elongate bodies that have a plurality of different shapes.

A32. The vacuum chuck of any of paragraphs A1-A31, wherein the skirt seal is configured to form the fluid seal with the flexible elongate body along a/the length of the flexible elongate body.

A33. The vacuum chuck of any of paragraphs A1-A32, wherein the vacuum chuck further includes a lift support configured to operatively attach the vacuum chuck to a lift mechanism.

A34. The vacuum chuck of paragraph A33, wherein the lift support is located on an upper side of the vertically oriented vacuum surface.

A35. The vacuum chuck of any of paragraphs A33-A34, wherein the lift support is centered, or at least substantially centered, along a length of the elongate rigid support.

A36. The vacuum chuck of any of paragraphs A33-A35, wherein the lift support is operatively attached, and optionally directly attached, to the elongate rigid support.

A37. The vacuum chuck of any of paragraphs A1-A36, wherein the vacuum chuck further includes a vacuum source, wherein the vacuum source is in fluid communication with the vacuum manifold and configured to selectively apply the retention vacuum to the plurality of vacuum holes via the vacuum manifold.

A38. The vacuum chuck of any of paragraphs A1-A37, wherein the vacuum chuck further includes at least one side seal, wherein the side seal extends along an end of the vertically oriented vacuum surface and is configured to contact the flexible elongate body and to restrict fluid flow between the side seal and the flexible elongate body when the flexible elongate body is retained on the vertically oriented vacuum surface.

A39. The vacuum chuck of paragraph A38, wherein the at least one side seal includes a first side seal that extends along a first end of the vertically oriented vacuum surface and a second side seal that extends along a second end of the vertically oriented vacuum surface.

A40. The vacuum chuck of any of paragraphs A38-A39, wherein the at least one side seal includes at least one side lip seal.

A41. The vacuum chuck of any of paragraphs A1-A40, wherein the vacuum chuck further includes a lower seal, wherein the lower seal extends along the length of the vertically oriented vacuum surface and is configured to contact a lower edge of the flexible elongate body and to restrict fluid flow between the lower seal and the lower edge of the flexible elongate body when the flexible elongate body is retained on the vertically oriented vacuum surface.

A42. The vacuum chuck of paragraph A41, wherein the lower seal includes a lower lip seal.

A43. The vacuum chuck of any of paragraphs A1-A42, wherein the vacuum chuck further includes an auxiliary retention mechanism configured to supplement the retention vacuum when the flexible elongate body is retained on the vertically oriented vacuum surface and to prevent at least complete separation of the flexible elongate body from the vertically oriented vacuum surface.

A44. The vacuum chuck of paragraph A43, wherein the auxiliary retention mechanism includes at least a retaining conformation, in which the auxiliary retention mechanism restricts separation of the flexible elongate body from the vacuum chuck, and a released conformation, in which the auxiliary retention mechanism permits separation of the flexible elongate body from the vacuum chuck.

A45. The vacuum chuck of any of paragraphs A43-A44, wherein the auxiliary retention mechanism includes a retention strap.

A46. The vacuum chuck of any of paragraphs A43-A45, wherein the auxiliary retention mechanism includes a pivotal auxiliary retention mechanism.

A47. The vacuum chuck of any of paragraphs A1-A46, wherein the vertically oriented vacuum surface is a first vertically oriented vacuum surface, and further wherein the vacuum chuck includes a second vertically oriented vacuum surface.

A48. The vacuum chuck of paragraph A47, wherein the first vertically oriented vacuum surface and the second vertically oriented vacuum surface face away from one another.

A49. The vacuum chuck of any of paragraphs A47-A48, wherein the elongate rigid support extends at least partially, and optionally completely, between the first vertically oriented vacuum surface and the second vertically oriented vacuum surface.

A50. The vacuum chuck of any of paragraphs A47-A49, wherein the vacuum manifold is a first vacuum manifold, wherein the plurality of vacuum holes is a first plurality of vacuum holes, wherein the first vacuum manifold is in fluid communication with the first plurality of vacuum holes, wherein the retention vacuum is a first retention vacuum, wherein the flexible elongate body is a first flexible elongate body, wherein the second vertically oriented vacuum surface includes a second plurality of vacuum holes, and further wherein the vacuum chuck includes a second vacuum manifold in fluid communication with the second plurality of vacuum holes and configured to apply a second retention vacuum to the second plurality of vacuum holes to retain a second flexible elongate body on the second vertically oriented vacuum surface during transfer of the second flexible elongate body by the vacuum chuck.

A51. The vacuum chuck of paragraph A50, wherein the vacuum chuck is configured to apply the first retention vacuum to the first plurality of vacuum holes independent from application of the second retention vacuum to the second plurality of vacuum holes.

A52. The vacuum chuck of any of paragraphs A1-A51 in combination with the flexible elongate body, optionally wherein the flexible elongate body is retained on the vertically oriented vacuum surface by the retention vacuum, and further optionally wherein the skirt seal extends across an upper surface of the flexible elongate body.

A53. The vacuum chuck of any of paragraphs A1-A52, wherein the vacuum chuck includes a plurality of independent vacuum manifolds, wherein the vertically oriented vacuum surface includes a plurality of independent regions, and further wherein each of the plurality of independent vacuum manifolds is in fluid communication with a respective one of the plurality of independent regions of the vertically oriented vacuum surface.

A54. The vacuum chuck of paragraph A53, wherein each of the plurality of independent vacuum manifolds is configured to permit independent control of application of a respective retention vacuum to the respective one of the plurality of independent regions of the vertically oriented vacuum surface.

A55. The vacuum chuck of any of paragraphs A53-A54, wherein the plurality of independent vacuum manifolds is configured to permit application of the retention vacuum to at least one of the plurality of independent regions of the vertically oriented vacuum surface without applying the retention vacuum to at least one other of the plurality of independent regions of the vertically oriented vacuum surface.

A56. The vacuum chuck of any of paragraphs A53-A55, wherein the plurality of independent vacuum manifolds is configured to permit independent control of a level of the retention vacuum that is applied to at least one of the plurality of independent regions of the vertically oriented vacuum surface relative to at least one other of the plurality of independent regions of the vertically oriented vacuum surface.

A57. The vacuum chuck of any of paragraphs A53-A56, wherein the plurality of independent regions of the vertically oriented vacuum surface is spaced-apart along a length of the vertically oriented vacuum surface.

A58. The vacuum chuck of any of paragraphs A53-A57, wherein the plurality of independent regions of the vertically oriented vacuum surface is spaced-apart along a height of the vertically oriented vacuum surface.

B1. A system for transferring a flexible elongate body, the system comprising:
  an elongate horizontal support structure;
  a transfer structure configured to support the elongate horizontal support structure;
  a plurality of vertical linkages, wherein each of the plurality of vertical linkages extends between an upper end and a lower end, wherein the upper end is operatively attached to the elongate horizontal support structure, and further wherein the plurality of vertical linkages extends from the elongate horizontal support structure; and
  a plurality of vacuum chucks, wherein each of the plurality of vacuum chucks includes a respective lift support and is operatively attached to the lower end of a respective one of the plurality of vertical linkages via the respective lift support, further wherein each of the plurality of vacuum chucks is configured to selectively retain a respective portion of a vertical surface of the flexible elongate body.

B2. The system of paragraph B1, wherein the elongate horizontal support structure includes at least one of a truss and a gantry.

B3. The system of any of paragraphs B1-B2, wherein the elongate horizontal support structure is a rigid, or at least substantially rigid, elongate horizontal support structure.

B4. The system of any of paragraphs B1-B3, wherein the elongate horizontal support structure is configured to be suspended from the transfer structure and to pre-deflect to a pre-loaded conformation prior to selective retention of the flexible elongate body with the plurality of vacuum chucks.

B5. The system of any of paragraphs B1-B4, wherein the length of the elongate horizontal support structure is at least one of:
  (i) at least 10 meters, at least 15 meters, at least 20 meters, at least 25 meters, at least 30 meters, at least 40 meters, or at least 50 meters; and
  (ii) less than 100 meters, less than 90 meters, less than 80 meters, less than 70 meters, less than 60 meters, less than 50 meters, less than 40 meters, less than 30 meters, or less than 20 meters.

B6. The system of any of paragraphs B1-B5, wherein the transfer structure is configured to selectively suspend the elongate horizontal support structure above a ground surface.

B7. The system of any of paragraphs B1-B6, wherein the transfer structure is configured to operatively translate the elongate horizontal support structure in a vertical, or at least substantially vertical, direction.

B8. The system of any of paragraphs B1-B7, wherein the transfer structure is configured to operatively translate the elongate horizontal support structure in a horizontal, or at least substantially horizontal, direction.

B9. The system of any of paragraphs B1-B8, wherein the transfer structure includes a hoist.

B10. The system of any of paragraphs B1-B9, wherein the transfer structure includes a gantry crane.

B11. The system of any of paragraphs B1-B10, wherein each of the plurality of vertical linkages extends vertically, or at least substantially vertically, below the elongate horizontal support structure.

B12. The system of any of paragraphs B1-B11, wherein each of the plurality of vertical linkages is suspended from the elongate horizontal support structure via a respective pivotal linkage.

B13. The system of paragraph B12, wherein the respective pivotal linkage permits rotation of a respective vertical linkage relative to the elongate horizontal support structure about a pivot axis.

B14. The system of paragraph B13, wherein the pivot axis is perpendicular to a longitudinal axis of the elongate horizontal support structure.

B15. The system of any of paragraphs B13-B14, wherein the pivot axis is perpendicular, or at least substantially perpendicular, to a vertical direction.

B16. The system of any of paragraphs B1-B15, wherein each of the plurality of vertical linkages is configured to be adjusted among a plurality of different respective lengths to permit a respective vacuum chuck of the plurality of vacuum chucks to be aligned with the respective portion of the vertical surface of the flexible elongate body.

B17. The system of paragraph B16, wherein the plurality of different respective lengths defines a plurality of different distances between the upper end and the lower end.

B18. The system of any of paragraphs B16-B17, wherein each of the plurality of vertical linkages includes at least one of a linear actuator, a rack and pinion assembly, a lead screw and nut assembly, a linear motor, and a gas lock spring.

B19. The system of any of paragraphs B16-B18, wherein each of the plurality of vertical linkages is configured to be at least one of:
  (i) manually adjusted among the plurality of different respective lengths;
  (ii) electrically adjusted among the plurality of different respective lengths;
  (iii) mechanically adjusted among the plurality of different respective lengths;
  (iv) pneumatically adjusted among the plurality of different respective lengths; and
  (v) hydraulically adjusted among the plurality of different respective lengths.

B20. The system of any of paragraphs B1-B19, wherein the respective lift support is configured to permit rotation of a respective vacuum chuck of the plurality of vacuum chucks about a vacuum chuck rotational axis.

B21. The system of paragraph B20, wherein the vacuum chuck rotational axis is perpendicular to a/the longitudinal axis of the elongate horizontal support structure.

B22. The system of any of paragraphs B20-B21, wherein the vacuum chuck rotational axis is perpendicular to a/the vertical direction.

B23. The system of any of paragraphs B1-B22, wherein the plurality of vacuum chucks is configured to selectively retain the respective portion of the vertical surface of the flexible elongate body via selective application of a retention vacuum.

B24. The system of any of paragraphs B1-B23, wherein the plurality of vacuum chucks includes the vacuum chuck of any of paragraphs A1-A58.

B25. The system of any of paragraphs B1-B24, wherein the vertical surface of the flexible elongate body is planar, or at least substantially planar.

B26. The system of any of paragraphs B1-B25, wherein the flexible elongate body further includes an upper surface, and optionally wherein the upper surface is arcuate along a length of the flexible elongate body.

B27. The system of any of paragraphs B1-B26, wherein the vertical surface of the flexible elongate body defines a nonlinear, and optionally an arcuate, trajectory in a direction that is parallel to the vertical surface.

B28. The system of paragraph B27, wherein the plurality of vertical linkages and the plurality of vacuum chucks together are configured to be adjusted to permit alignment of each of the plurality of vacuum chucks with the respective portion of the vertical surface of the flexible elongate body.

B29. The system of any of paragraphs B1-B28, wherein the system further includes the flexible elongate body.

B30. The system of paragraph B29, wherein each of the plurality of vacuum chucks is in contact with, and operatively retains, the respective portion of the vertical surface of the flexible elongate body.

B31. The system of any of paragraphs B29-B30, wherein the flexible elongate body is suspended via the plurality of vacuum chucks.

B32. The system of any of paragraphs B29-B31, wherein the plurality of vacuum chucks retains the vertical surface of the flexible elongate body in a planar, or at least substantially planar, conformation.

B33. The system of paragraph B32, wherein a longitudinal axis of each of the plurality of vacuum chucks is aligned with a trajectory of the respective portion of the vertical surface of the flexible elongate body.

B34. The system of paragraph B33, wherein a longitudinal axis of a first portion of the plurality of vacuum chucks is not aligned with a longitudinal axis of a second portion of the plurality of vacuum chucks.

C1. A method of transferring a flexible elongate body, the method comprising:
  suspending an elongate horizontal support structure with a transfer structure, wherein an upper end of each of a plurality of vertical linkages is operatively attached to the elongate horizontal support structure, wherein each of the plurality of vertical linkages extends vertically, or at least substantially vertically, from the elongate horizontal support structure, wherein a respective vacuum chuck of a plurality of vacuum chucks is operatively attached to a lower end of each of the plurality of vertical linkages, and further wherein the suspending the elongate horizontal support structure includes suspending the plurality of vacuum chucks;
  aligning each of the plurality of vacuum chucks with a respective portion of a vertical surface of the flexible elongate body;
  selectively actuating each of the plurality of vacuum chucks to retain the respective portion of the vertical surface of the flexible elongate body with each of the plurality of vacuum chucks; and
  lifting the flexible elongate body via translation of the elongate horizontal support structure such that the flexible elongate body is suspended from the plurality of vacuum chucks.

C2. The method of paragraph C1, wherein the suspending includes pre-deflecting the elongate horizontal support structure prior to the lifting to decrease deformation of the flexible elongate body subsequent to the lifting.

C3. The method of any of paragraphs C1-C2, wherein the suspending includes moving the elongate horizontal support structure in a vertical direction with the transfer structure such that a weight of the elongate horizontal support structure, a weight of the plurality of vertical linkages, and a weight of the plurality of vacuum chucks are supported by the transfer structure.

C4. The method of any of paragraphs C1-C3, wherein the aligning includes rotating at least a portion of the plurality of vertical linkages relative to the elongate horizontal support structure.

C5. The method of paragraph C4, wherein the rotating at least a portion of the plurality of vertical linkages includes rotating about a pivot axis that is perpendicular to a longitudinal axis of the elongate horizontal support structure.

C6. The method of any of paragraphs C1-05, wherein the aligning includes rotating at least one of the plurality of vacuum chucks relative to a respective one of the plurality of vertical linkages.

C7. The method of paragraph C6, wherein the rotating at least one of the plurality of vacuum chucks includes rotation about a vacuum chuck rotational axis that is perpendicular to a/the longitudinal axis of the elongate horizontal support structure.

C8. The method of any of paragraphs C1-C7, wherein the aligning includes aligning such that a longitudinal axis of each of the plurality of vacuum chucks is aligned with a trajectory of the respective portion of the vertical surface of the flexible elongate body.

C9. The method of paragraph C8, wherein the aligning includes aligning such that a longitudinal axis of a first portion of the plurality of vacuum chucks is not aligned with a longitudinal axis of a second portion of the plurality of vacuum chucks.

C10. The method of any of paragraphs C1-C9, wherein the selectively actuating includes selectively and operatively attaching each of the plurality of vacuum chucks to the respective portion of the vertical surface of the flexible elongate body.

C11. The method of any of paragraphs C1-C10, wherein the selectively actuating includes applying a retention vacuum to an interface between each of the plurality of vacuum chucks and the respective portion of the vertical surface of the flexible elongate body.

C12. The method of any of paragraphs C1-C11, wherein the lifting includes translating the elongate horizontal support structure in a/the vertical direction, optionally with the transfer structure, such that a weight of the flexible elongate body is supported by the elongate horizontal support structure.

C13. The method of any of paragraphs C1-C12, wherein the vacuum chuck includes the vacuum chuck of any of paragraphs A1-A58.

C14. The method of any of paragraphs C1-C13, wherein the method is performed utilizing the system of any of paragraphs B1-B34.

D1. The use of the vacuum chuck of any of paragraphs A1-A58 or the system of any of paragraphs B1-B34 with the method of any of paragraphs C1-C14.

D2. The use of the method of any of paragraphs C1-C14 with the vacuum chuck of any of paragraphs A1-A58 or the system of any of paragraphs B1-B34.

D3. The use of the vacuum chuck of any of paragraphs A1-A58, the system of any of paragraphs B1-B34, or the method of any of paragraphs C1-C14 to transfer an elongate flexible body.

E1. The vacuum chuck of any of paragraphs A1-A58, the system of any of paragraphs B1-B34, or the method of any of paragraphs C1-C14, wherein the flexible elongate body includes an uncured composite layup.

E2. The vacuum chuck of paragraph E1, the system of paragraph E1, or the method of paragraph E1, wherein the uncured composite layup includes a thermoset composite layup.

E3. The vacuum chuck of any of paragraphs E1-E2, the system of any of paragraphs E1-E2, or the method of any of paragraphs E1-E2, wherein the uncured composite layup includes a fiberglass, a fiberglass cloth, a carbon fiber, a carbon fiber cloth, a cloth, a pre-impregnated (pre-preg) composite material, a resin material, and/or an epoxy.

E4. The vacuum chuck of any of paragraphs A1-A58 or E1-E3, the system of any of paragraphs B1-B34 or E1-E3, or the method of any of paragraphs C1-C14 or E1-E3, wherein a/the length of the flexible elongate body is at least one of:
(i) at least 1 meter, at least 2 meters, at least 3 meters, at least 5 meters, at least 10 meters, at least 15 meters, at least 20 meters, or at least 25 meters; and
(ii) less than 50 meters, less than 40 meters, less than 30 meters, less than 20 meters, less than 10 meters, less than 8 meters, less than 6 meters, less than 5 meters, less than 4 meters, less than 3 meters, or less than 2 meters.

E5. The vacuum chuck of any of paragraphs A1-A58 or E1-E4, the system of any of paragraphs B1-B34 or E1-E4, or the method of any of paragraphs C1-C14 or E1-E4, wherein the vertical surface of the flexible elongate body has a height of at least one of:
(i) at least 1 centimeter (cm), at least 2 cm, at least 3 cm, at least 4 cm, at least 5 cm, at least 6 cm, at least 8 cm, at least 10 cm, at least 15 cm, or at least 20 cm; and
(ii) less than 50 cm, less than 40 cm, less than 30 cm, less than 25 cm, less than 20 cm, less than 15 cm, or less than 10 cm.

E6. The vacuum chuck of any of paragraphs A1-A58 or E1-E5, the system of any of paragraphs B1-B34 or E1-E5, or the method of any of paragraphs C1-C14 or E1-E5, wherein the vertical surface of the flexible elongate body is a planar, or at least substantially planar, vertical surface.

E7. The vacuum chuck of any of paragraphs A1-A58 or E1-E6, the system of any of paragraphs B1-B34 or E1-E6, or the method of any of paragraphs C1-C14 or E1-E6, wherein the flexible elongate body further includes an/the upper surface.

E8. The vacuum chuck of paragraph E7, the system of paragraph E7, or the method of paragraph E7, wherein the upper surface is arcuate along a/the length of the flexible elongate body.

E9. The vacuum chuck of any of paragraphs A1-A58 or E1-E8, the system of any of paragraphs B1-B34 or E1-E8, or the method of any of paragraphs C1-C14 or E1-E8, wherein the flexible elongate body includes, and optionally is, at least a portion of a composite stringer for an aircraft.

E10. The vacuum chuck of any of paragraphs A1-A58 or E1-E9, the system of any of paragraphs B1-B34 or E1-E9, or the method of any of paragraphs C1-C14 or E1-E9, wherein the flexible elongate body has an L-shaped cross-sectional shape.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses, elements of systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A vacuum chuck for transferring a flexible elongate body, the vacuum chuck comprising:
   an elongate rigid support;
   a vertically oriented vacuum surface including a plurality of vacuum holes, wherein the vertically oriented vacuum surface extends along a length of the elongate rigid support, is supported by the elongate rigid support, and is configured to contact a vertical surface of the flexible elongate body during transfer of the flexible elongate body by the vacuum chuck;
   a vacuum manifold in fluid communication with the plurality of vacuum holes and configured to apply a retention vacuum to the plurality of vacuum holes to retain the flexible elongate body on the vertically oriented vacuum surface during transfer of the flexible elongate body by the vacuum chuck; and
   a skirt seal that extends along a length of the vertically oriented vacuum surface, wherein the skirt seal is sized and located to form a fluid seal with the flexible elongate body;
   wherein the vertically oriented vacuum surface is a first vertically oriented vacuum surface, and further wherein the vacuum chuck includes a second vertically oriented vacuum surface, wherein the first vertically oriented vacuum surface and the second vertically oriented vacuum surface face away from one another, and further wherein the elongate rigid support extends at least partially between the first vertically oriented vacuum surface and the second vertically oriented vacuum surface;
   and further wherein the vacuum manifold is a first vacuum manifold, wherein the plurality of vacuum holes is a first plurality of vacuum holes, wherein the first vacuum manifold is in fluid communication with the first plurality of vacuum holes, wherein the retention vacuum is a first retention vacuum, wherein the flexible elongate body is a first flexible elongate body, wherein the second vertically oriented vacuum surface includes a second plurality of vacuum holes, wherein the vacuum chuck includes a second vacuum manifold in fluid communication with the second plurality of vacuum holes and configured to apply a second retention vacuum to the second plurality of vacuum holes to retain a second flexible elongate body on the second vertically oriented vacuum surface during transfer of the second flexible elongate body by the vacuum chuck, and further wherein the vacuum chuck is configured to apply the first retention vacuum to the first plurality of vacuum holes independent from application of the second retention vacuum to the second plurality of vacuum holes.

2. The vacuum chuck of claim 1, wherein the skirt seal is configured to resist peeling of the flexible elongate body from the vertically oriented vacuum surface when the flexible elongate body is in contact with the vertically oriented vacuum surface and the retention vacuum is applied to the plurality of vacuum holes.

3. The vacuum chuck of claim 1, wherein the elongate rigid support is a tubular elongate rigid support.

4. The vacuum chuck of claim 1, wherein the length of the elongate rigid support is at least 1 meter.

5. The vacuum chuck of claim 1, wherein the vertically oriented vacuum surface is defined by a body that is operatively attached to the elongate rigid support.

6. The vacuum chuck of claim 5, wherein the body includes a first planar wall, a second planar wall, and a plurality of elongate webs that extend between the first planar wall and the second planar wall, wherein the second planar wall is operatively attached to the elongate rigid support, wherein the first planar wall defines the vertically oriented vacuum surface, and further wherein the first planar wall includes a plurality of perforations that defines the plurality of vacuum holes.

7. The vacuum chuck of claim 1, wherein the vacuum manifold is at least partially defined by the elongate rigid support.

8. The vacuum chuck of claim 1, wherein the vacuum manifold includes a vacuum conduit that is external to the elongate rigid support.

9. The vacuum chuck of claim 1, wherein the skirt seal includes a sheet of flexible material that is configured to at least partially overlap with the flexible elongate body when the flexible elongate body is retained on the vertically oriented vacuum surface.

10. The vacuum chuck of claim 1, wherein the skirt seal is configured to restrict fluid flow past an upper surface of the flexible elongate body when the flexible elongate body is retained on the vertically oriented vacuum surface.

11. The vacuum chuck of claim 1, wherein the skirt seal is configured to form the fluid seal with the flexible elongate body along a length of the flexible elongate body.

12. The vacuum chuck of claim 1, wherein the vacuum chuck includes a plurality of independent vacuum manifolds, wherein the vertically oriented vacuum surface includes a plurality of independent regions, and further wherein each of the plurality of independent vacuum manifolds is in fluid communication with a respective one of the plurality of independent regions of the vertically oriented vacuum surface.

13. The vacuum chuck of claim 12, wherein each of the plurality of independent vacuum manifolds is configured to permit independent control of application of a respective retention vacuum to the respective one of the plurality of independent regions of the vertically oriented vacuum surface.

14. A system for transferring a flexible elongate body, the system comprising:
- an elongate horizontal support structure;
- a transfer structure configured to support the elongate horizontal support structure;
- a plurality of vertical linkages, wherein each of the plurality of vertical linkages extends between an upper end and a lower end, wherein the upper end is operatively attached to the elongate horizontal support structure, and further wherein the plurality of vertical linkages extends from the elongate horizontal support structure; and
- a plurality of vacuum chucks, wherein each of the plurality of vacuum chucks includes a respective lift support and is operatively attached to the lower end of a respective one of the plurality of vertical linkages via the respective lift support, further wherein each of the plurality of vacuum chucks is configured to selectively retain a respective portion of a vertical surface of the flexible elongate body, and further wherein at least one of the plurality of vacuum chucks includes the vacuum chuck of claim 1.

15. The system of claim 14, wherein the elongate horizontal support structure is configured to be suspended from the transfer structure and to pre-deflect to a pre-loaded conformation prior to selective retention of the flexible elongate body with the plurality of vacuum chucks.

16. The system of claim 14, wherein a length of the elongate horizontal support structure is at least 10 meters.

17. The system of claim 14, wherein each of the plurality of vertical linkages is suspended from the elongate horizontal support structure via a respective pivotal linkage.

18. The system of claim 14, wherein each of the plurality of vertical linkages is configured to be adjusted among a plurality of different respective lengths to permit a respective vacuum chuck of the plurality of vacuum chucks to be aligned with the respective portion of the vertical surface of the flexible elongate body.

19. The system of claim 14, wherein the respective lift support is configured to permit rotation of a respective vacuum chuck of the plurality of vacuum chucks about a vacuum chuck rotational axis.

20. The system of claim 14, wherein the plurality of vacuum chucks is configured to selectively retain the respective portion of the vertical surface of the flexible elongate body via selective application of a retention vacuum.

21. A method of transferring a flexible elongate body, the method comprising:
- suspending an elongate horizontal support structure with a transfer structure, wherein an upper end of each of a plurality of vertical linkages is operatively attached to the elongate horizontal support structure, wherein each of the plurality of vertical linkages extends vertically, or at least substantially vertically, from the elongate horizontal support structure, wherein a respective vacuum chuck of a plurality of vacuum chucks is operatively attached to a lower end of each of the plurality of vertical linkages, wherein the suspending the elongate horizontal support structure includes suspending the plurality of vacuum chucks, and further wherein at least one of the plurality of vacuum chucks includes the vacuum chuck of claim 1;
- aligning each of the plurality of vacuum chucks with a respective portion of a vertical surface of the flexible elongate body;
- selectively actuating each of the plurality of vacuum chucks to retain the respective portion of the vertical surface of the flexible elongate body with each of the plurality of vacuum chucks; and
- lifting the flexible elongate body via translation of the elongate horizontal support structure such that the flexible elongate body is suspended from the plurality of vacuum chucks.

22. A vacuum chuck for transferring a flexible elongate body, the vacuum chuck comprising:
- an elongate rigid support;
- a vertically oriented vacuum surface including a plurality of vacuum holes, wherein the vertically oriented vacuum surface extends along a length of the elongate rigid support, is supported by the elongate rigid support, and is configured to contact a vertical surface of the flexible elongate body during transfer of the flexible elongate body by the vacuum chuck;
- a vacuum manifold in fluid communication with the plurality of vacuum holes and configured to apply a retention vacuum to the plurality of vacuum holes to retain the flexible elongate body on the vertically oriented vacuum surface during transfer of the flexible elongate body by the vacuum chuck; and
- a skirt seal that extends along a length of the vertically oriented vacuum surface, wherein the skirt seal is sized and located to form a fluid seal with the flexible elongate body;
- wherein the vertically oriented vacuum surface is a first vertically oriented vacuum surface, and further wherein the vacuum chuck includes a second vertically oriented vacuum surface, wherein the first vertically oriented vacuum surface and the second vertically oriented vacuum surface face away from one another, and further wherein the elongate rigid support extends at least partially between the first vertically oriented vacuum surface and the second vertically oriented vacuum surface;
- and further wherein the vacuum chuck includes a plurality of independent vacuum manifolds, wherein the vertically oriented vacuum surface includes a plurality of independent regions, and further wherein each of the plurality of independent vacuum manifolds is in fluid communication with a respective one of the plurality of independent regions of the vertically oriented vacuum surface.

23. The vacuum chuck of claim 22, wherein each of the plurality of independent vacuum manifolds is configured to permit independent control of application of a respective retention vacuum to the respective one of the plurality of independent regions of the vertically oriented vacuum surface.

* * * * *